(12) United States Patent
Zurek et al.

(10) Patent No.: US 7,346,315 B2
(45) Date of Patent: Mar. 18, 2008

(54) HANDHELD DEVICE LOUDSPEAKER SYSTEM

(75) Inventors: Robert A. Zurek, Antioch, IL (US); Simone Koo, Palatine, IL (US)

(73) Assignee: Motorola Inc, Schaumburg, IL (US)

( * ) Notice: Subject to any disclaimer, the term of this patent is extended or adjusted under 35 U.S.C. 154(b) by 903 days.

(21) Appl. No.: 10/813,458

(22) Filed: Mar. 30, 2004

(65) Prior Publication Data

US 2005/0221867 A1    Oct. 6, 2005

(51) Int. Cl.
*H04B 1/38* (2006.01)

(52) U.S. Cl. ............... 455/90.3; 455/569.1; 455/575.1; 381/335

(58) Field of Classification Search ............... 455/90.3, 455/569.1, 128, 575.1; 381/335, 334, 342
See application file for complete search history.

(56) References Cited

U.S. PATENT DOCUMENTS

| | | | | |
|---|---|---|---|---|
| 1,689,149 | A * | 10/1928 | McCloud | 414/466 |
| 6,198,831 | B1 * | 3/2001 | Azima et al. | 381/338 |
| 6,324,380 | B1 * | 11/2001 | Kiuchi et al. | 455/12.1 |
| 6,931,140 | B2 * | 8/2005 | Van Halteren et al. | 381/182 |
| 7,103,393 | B2 * | 9/2006 | Hwang | 455/569.1 |
| 7,263,196 | B2 * | 8/2007 | Aubauer et al. | 381/332 |
| 2002/0028693 | A1 * | 3/2002 | Johnson | 455/550 |
| 2003/0003879 | A1 * | 1/2003 | Saiki et al. | 455/90 |
| 2004/0202338 | A1 * | 10/2004 | Longbottom et al. | 381/190 |
| 2006/0094378 | A1 * | 5/2006 | Murray et al. | 455/128 |
| 2006/0128440 | A1 * | 6/2006 | Murray et al. | 455/569.1 |

FOREIGN PATENT DOCUMENTS

| | | |
|---|---|---|
| EP | 1 282 335 A2 | 2/2003 |
| WO | WO 95/34184 | 12/1995 |
| WO | WO 02/078390 A2 | 10/2002 |

* cited by examiner

*Primary Examiner*—Matthew Anderson
*Assistant Examiner*—Minh Dao
(74) *Attorney, Agent, or Firm*—Gary J. Cunningham

(57) ABSTRACT

Loudspeaker systems for handheld devices (2400, 2500) such as cellular telephones (100, 1400, 1600, 1900) are provided. The loudspeaker systems include at least one omnidirectional monopole loudspeaker (404, 1504, 1802, 1918, 1920) and at least one dipole loudspeaker (402, 1502, 1804, 1914, 1916). Filtering is used to compensate for differences between electric-to-acoustic signal transfer functions of the loudspeakers in order to achieve destructive interference of emitted audio in one direction and reinforcement in another direction. Various loudspeaker systems that are reconfigurable from directional mode, to omnidirectional mode are provided. Filtering is also used to add a frequency dependent phase to one signal in order to alter a direction of maximum sound pressure level. Two monopole-dipole pairs can be used to produce a stereo effect. The monopole and dipole loudspeakers can be housed in a detachable loudspeaker accessory (200).

16 Claims, 11 Drawing Sheets

500

600

7,346,315 B2

HANDHELD DEVICE LOUDSPEAKER SYSTEM

FIELD OF THE INVENTION

The present invention relates in general to audio systems for handheld devices. More particularly, the present invention relates loudspeakers and electronics for driving loudspeakers for handheld devices.

BACKGROUND OF THE INVENTION

In the past decade cellular telephones have become very popular. Many cellular service subscribes use their cellular telephones as much as, or more than their conventional telephones. Given the high reliance on cellular telephones, there is an interest in making cellular telephones that have functionality comparable to conventional telephones.

To that end, speakerphone capability has been added to cellular telephones. Operating in speakerphone mode, a cellular telephone uses a loudspeaker to output received audio, and sensitive microphone to pick up a voice or voices of one or more users who may be a few feet away from the cellular telephone. As in the case of conventional telephones, speakerphone mode can be used to allow more than one person to participate in a conversation with another party using a single cellular telephone. In such a mode of use, it is beneficial to have a loudspeaker that emits strongly over a large solid angle, so that, for example the cellular telephone could be set on a desk and people positioned around the desk would be able to hear the loudspeaker.

On the other hand, some users prefer to use a cellular telephone as they would a walkie-talkie. In such a mode of use the cellular telephone is often held in front of the user's face, (as opposed to being held to the ear). Although it is also preferable to use a loudspeaker in this mode, there is no need for the loudspeaker to emit over a large solid angle, and in fact, this is undesirable in that it may facilitate unwanted eavesdropping or disturb others in the vicinity if the cellular telephone is being used in a public place.

It would be desirable to have a handheld device loudspeaker system that allows a measure of control over a number of other people that will be able to overhear parts of a conversation output by the handheld device loudspeaker system.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
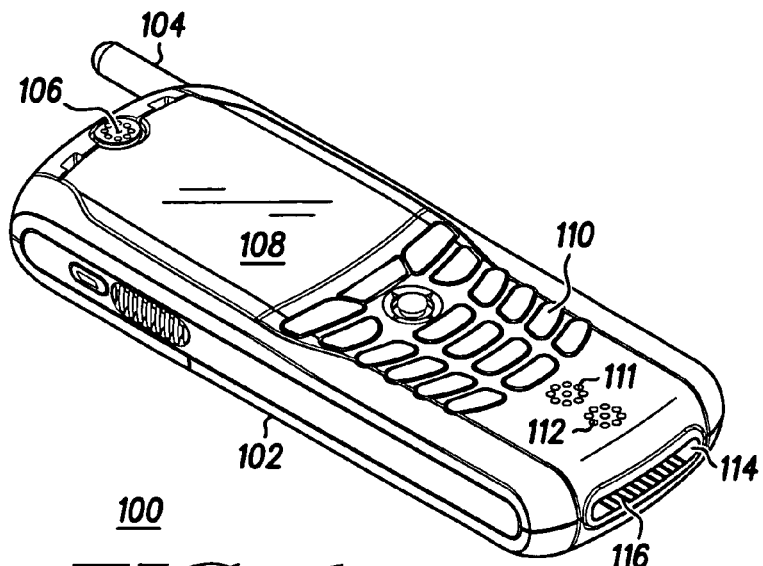
FIG. 1 is a perspective view of a first embodiment of a cellular telephone.

FIG. 1 is a perspective view of a first embodiment of a cellular telephone 100. The first cellular telephone 100 comprises a housing 102 that encloses and connects a plurality of components including an antenna 104, an earpiece speaker 106, a display 108, a keypad 110, a first microphone 111, and a second microphone 112, electrical circuits (not shown) and an accessory electrical connector socket 114. The accessory electrical connector socket 114 includes a first plurality of contacts 116.

Figure 2:
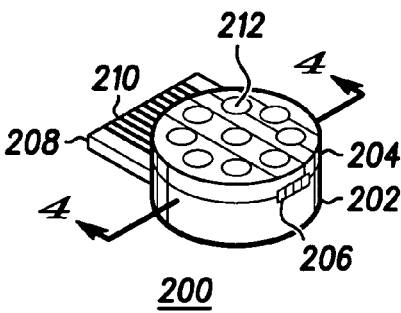
FIG. 2 is a perspective view of a loudspeaker accessory for the cellular telephone shown in FIG. 1.

FIG. 2 is a perspective view of a loudspeaker accessory 200 for the cellular telephone 100 shown in FIG. 1. The loudspeaker accessory 200 includes a cylindrical cavity 202, to which a lid 204 is attached by a hinge 206. An electrical plug 208 that is attached to the cavity 202 is adapted to plug into the accessory electrical connector socket 114 of the cellular telephone 100. A second plurality of contacts 210 is located on the plug 208. A first grill 212 of the cap 204 is visible in FIG. 2.

Figure 3:
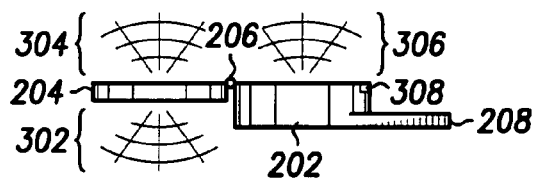
FIG. 3 is a side view of the loudspeaker accessory shown in FIG. 2, configured to radiate audio directionally.

FIG. 3 is a side view of the loudspeaker accessory 200 shown in FIG. 2. As shown in FIG. 2 the lid 204 is pivoted away from the cavity 202. The configuration shown in FIG. 3 is used for radiating acoustic signals in a preferred directions (as opposed to equally in all directions). A sensor 308 that is located on the cylindrical cavity 202 serves to detect when the lid 204 is open.

Figure 4:
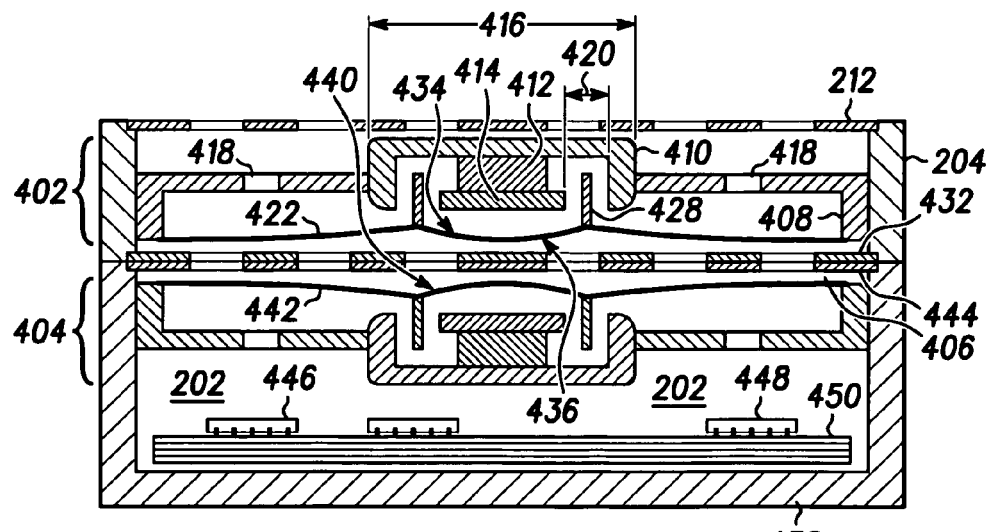
FIG. 4 is a cross-sectional elevation view of the loudspeaker accessory shown in FIGS. 2,3.

FIG. 4 is a cross-sectional elevation view of the loudspeaker accessory 200 shown in FIGS. 2,3. The section plane of FIG. 4 is indicated in FIG. 2. As shown in FIG. 2, a first loudspeaker 402 is located in the lid 204, and a second loudspeaker 404 is located at a top opening 406 of the cylindrical cavity 202. Although as shown, the first 402, and second 404 loudspeakers share a common internal design, however this need not be the case. Even in the case that the speakers share a common internal design, what differentiates the loudspeakers 402, 404 is the manner in which they are acoustically loaded and coupled to the surrounding acoustic environment (e.g. air). Given the common internal design depicted a description of the details of the internal design of the loudspeakers 402, 404 will be focused on the first loudspeaker 402.

The first loudspeaker 402 comprises an outer support ring 408. A cup shaped backplate 410 fits in a central hole 416 in the support ring 408. (In the configuration shown in FIG. 4, the cup shaped backplate 410 is upside-down). A magnet slug 412 is centered within the cup shaped backplate 410. A circular top plate 414 is also located within the cup shaped backplate 410 coaxial with, and covering the magnet slug 412. Magnetic flux emanating from the magnet slug 412 passes through the cup shaped backplate 410, and radially across an annular gap 420 between the cup shaped backplate 410 and the top plate 414, into the top plate 414 and back to the magnet slug 412.

A loudspeaker diaphragm 422 is attached along its periphery to the outer support ring 408. A plurality of ports 418 in the outer support ring 408 located around the central hole 416 serve to acoustically couple the diaphragm 422 to the air on top (in the perspective of FIG. 4) of the first loudspeaker 402.

A voice coil 428 is attached to the loudspeaker diaphragm 422 and is disposed in the annular gap 420. The voice coil 428 is immersed in the magnetic flux crossing the annular gap 420.

In operation when an audio electrical signal is applied to the voice coil 428, owing to the cross product of current in the voice coil 428 and magnetic flux in the annular gap 420, a Lorentz force proportional to the audio electric signal will be exerted on the voice coil 428. The force will be transferred to the diaphragm 422, causing the diaphragm 422 to excite sound waves.

Whereas the first grill 212 is located on top (in the configuration of the accessory 200, shown in FIG. 4) of the first loudspeaker 402, a second grill 432, that is attached to the lid 204, is located below the first loudspeaker 402. Thus, when the lid 204 is swung away from the cylindrical cavity 202, as shown in FIG. 3, both a top (in the perspective of FIG. 4) surface 434 of the diaphragm 422 and a bottom surface 436 of the diaphragm 422 of the first loudspeaker 402, will be acoustically coupled to air in the environment of the loudspeaker accessory 200. The top surface 434 will be coupled through the plurality of ports 418 and the first grill 212, and the bottom surface 436 will be coupled through the second grill 432. Acoustic radiation 302 from the top surface 434 and acoustic radiation 304 from the bottom surface 436 of the diaphragm 422 are represented schematically in FIG. 3. Note, that the acoustic radiation 302 excited by the top surface 434 of the diaphragm 422 is opposite in phase relative to the acoustic radiation 304 excited by the bottom surface 436. This is explained by the fact that when air is being compressed on one side of the diaphragm 422 air is being rarified on the other side. This type of loudspeaker in which both the top 434 and bottom 436 surfaces of the diaphragm 422 are in contact with the surrounding acoustic medium (air) is termed a 'dipole' loudspeaker.

Whereas the second loudspeaker 404 is located at the top opening 406 of the cylindrical cavity 202, a bottom of the cavity 202 is closed by an end wall 438. Thus, only a top surface 440 of a diaphragm 442 of the second loudspeaker 404 is coupled to air outside the loudspeaker accessory 200. Note that a third grill 444 covers the second loudspeaker 404. Acoustic radiation 306 from the top surface 440 of the diaphragm 442 of the second loudspeaker 404 is also schematically illustrated in FIG. 3. In as much as only the top surface 440 of the diaphragm 442 of the second loudspeaker 404 is in contact with the surrounding acoustic medium, the second loudspeaker functions as what is termed a 'monopole' loudspeaker.

Although a particular internal design of the first 402, and second 404 loudspeakers is illustrated in FIG. 4, the particular mechanical details are merely examples.

A first audio power amplifier 446, and a second power amplifier 448 are provided on a printed wiring board 450 that is located at the bottom of the cavity 202 on the end wall 438. The power amplifiers 446, 448 are coupled to the second plurality of contacts 210, and are coupled to the first 402, and second loudspeakers by leads (not shown).

Figure 5:
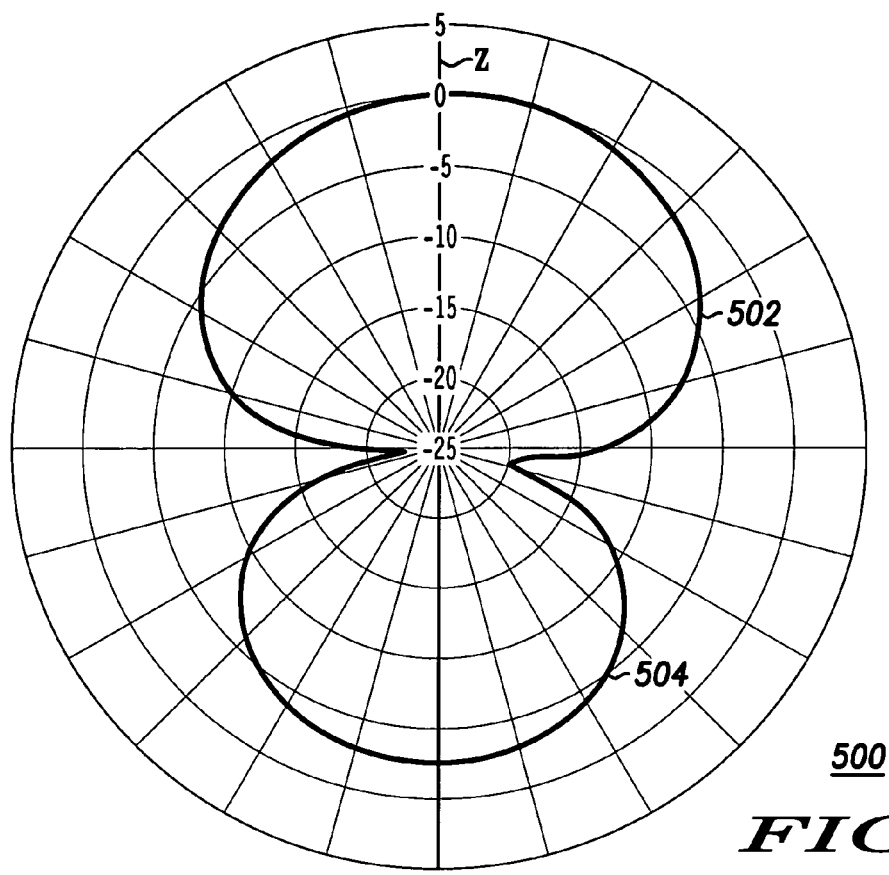
FIG. 5 is a normalized polar sound pressure level plot in decibels for a loudspeaker that is a functional analog of a first loudspeaker used in the loudspeaker accessory shown in FIGS. 2-4.

FIG. 5 is a polar sound pressure level plot 500 for a loudspeaker that is a functional analog of the first loudspeaker 402 used in the loudspeaker accessory 200 shown in FIGS. 2-4. The sound pressure level plot shown in FIG. 5 was obtained from measurement of a 20 millimeter microloudspeaker. The sound pressure level plot 500 is for a 750 Hz audio signal, and the diameter of the diaphragm of the loudspeaker was 17.75 millimeters. An azimuthal axis of symmetry, Z for the polar plot is indicated in FIG. 5. For the first loudspeaker 402 the z-axis would be perpendicular the top surface 434 of the diaphragm 422 (at the center of the diaphragm). The polar sound pressure level plot 500 includes an upper lobe 502, and a lower lobe 504. A radiated acoustic field corresponding to the upper lobe 502 is opposite in phase (180 degrees out of phase) relative to a radiated acoustic field corresponding to the lower lobe 504 for the reasons mentioned above. At an angular range where the two lobes 502, 504 meet, the amplitude of radiated sound is low.

Figure 6:
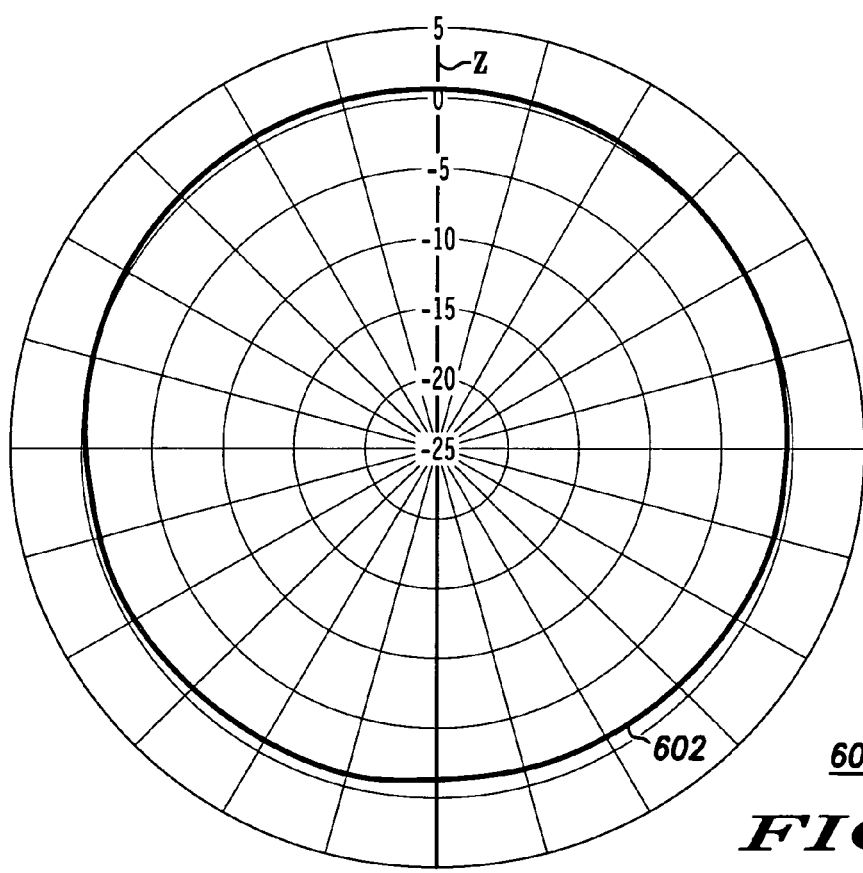
FIG. 6 is a normalized polar sound pressure level plot in decibels for a loudspeaker that is a functional analog of a second loudspeaker used in the loudspeaker accessory shown in FIGS. 2-4.

FIG. 6 is a polar sound pressure level plot 600 for a loudspeaker that is a functional analog of the second loudspeaker 404 used in the loudspeaker accessory 200 shown in FIGS. 2-4. The sound pressure level plot 600 is for a 750 Hz audio signal, and the diameter of the diaphragm of the loudspeaker was 17.75 millimeters. As shown in FIG. 6 the polar sound pressure level 600 is omnidirectional and nearly isotropic. Moreover with a monopole, the phase of radiated acoustic waves is mainly dependent on the radial coordinate with little dependence on polar or azimuthal coordinate. For monopole speakers having diaphragms, the diameters of which are one-quarter or less of the minimum wavelength of sound radiated, the radiation pattern will be approximately omnidirectional.

Roughly speaking if the phases of driving signals applied to the loudspeakers 402, 404 are adjusted so that sound energy in the upper lobe 502, is in phase with sound energy radiated by the second loudspeaker 404, then sound energy radiated in the lower lobe 504 will be 180 degrees out of phase with sound radiated by the second loudspeaker 404, and there will be a destructive interference effect in an angular range corresponding to the lower lobe 504.

Each of the loudspeakers 402, 404 is characterized by an electric-to-acoustic signal transfer function. Each electric-to-acoustic signal transfer function describes the phase and magnitude relationship between an electric signal applied to one of the loudspeakers, and an acoustic wave output by the particular loudspeaker. The electric-to-acoustic signal transfer function is dependent on frequency. For loudspeakers in as much as the far field response is of interest, output acoustic waves will be measured at a distance that is much larger than the dimensions of the loudspeaker being tested (e.g., 1 meter). As is apparent from inspection of FIG. 5, for certain speakers the magnitude of the radiated sound is strongly dependent on the angle of radiation considered. As discussed previously for speakers of the same type as the first loudspeaker 402, the phase of acoustic waves that are generated is also dependent on the direction in which the waves are radiated. Accordingly, the electric-to-acoustic signal transfer function is often dependent on the angular position at which acoustic waves are measured.

Because the first 402, and second 404 loudspeakers are different, it is generally to be expected that their frequency dependent electric-to-acoustic signal transfer functions will be different.

Figure 7:
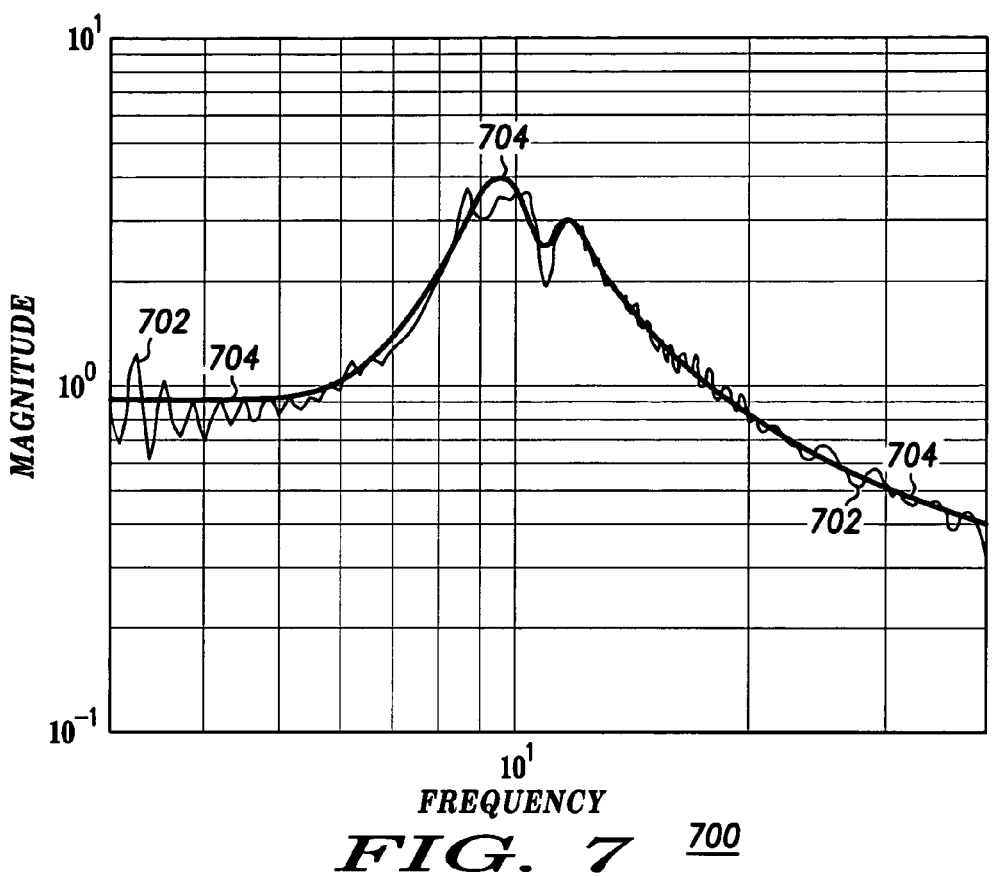
FIG. 7 is a plot of magnitude versus frequency for a filter designed to compensate for differences between electric-to-acoustic signal transfer functions of the first and second loudspeakers used in the loudspeaker accessory shown in FIGS. 2-4.
Figure 8:
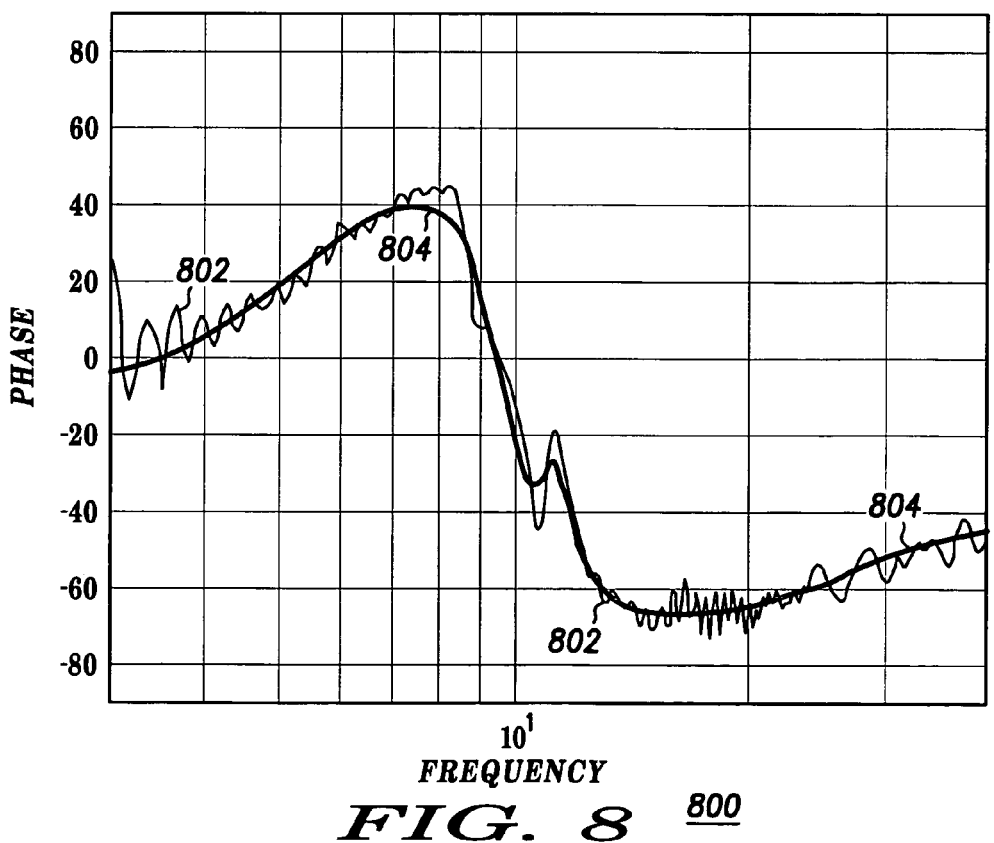
FIG. 8 is a plot of phase versus frequency for the filter designed to compensate for differences between electric-to-acoustic signal transfer functions of the first and second loudspeakers used in the loudspeaker accessory shown in FIGS. 2-4.

FIG. 7 is a graph 700 illustrating the differences in the magnitude of the electric-to-acoustic transfer functions of the first 402 and the second 404 loudspeakers and FIG. 8 is a graph 800 illustrating the differences in the phase of the electric-to-acoustic transfer functions of the first 402 and the second 404 loudspeakers.

At each frequency, each electric-to-acoustic transfer function is described by a magnitude and a phase, or alternatively a complex number having real and imaginary parts. Similarly, the operation of a filter can also be described by a multiplication, at each frequency separately, by a complex number. The characteristics of a filter function needed to compensate for differences between two electric-to-acoustic transfer functions (e.g. for the two loudspeakers 402, 404), can be determined by dividing (at each frequency separately) the complex number characterizing a first of the two electric-to-acoustic signal transfer functions, by the complex number characterizing a second of the two electric-to-acoustic signal transfer functions. The division yields a complex ratio (at each frequency separately) that when multiplied by the second electric-to-acoustic transfer function (at each frequency separately) yields a filtered second electric-to-acoustic transfer function that is equal to the first electric-to-acoustic transfer function. In as much as dipole loudspeakers have an unnatural sounding frequency response, matching the first loudspeaker (dipole) 402 to the second loudspeaker (monopole) 404 by filtering the signal applied to the first loudspeaker 402 serves to improve the sound quality of the first loudspeaker 402.

A first plot 702 in the graph 700 is the magnitude versus frequency of a complex ratio of the electric-to-acoustic signal transfer functions of functional analogs of the first 402 and second 404 loudspeakers. A first plot 802 in graph 800 is the phase versus frequency of the complex ratio of the electric-to-acoustic signal transfer functions of functional analogs of the first 402 and second 404 loudspeakers. Plots 702, 802 are based on measurements of a 20 millimeter microloudspeaker without an enclosure operating as a dipole and a 20 millimeter microloudspeaker with a cylindrical enclosure operating as a monopole. The first plots 702, 802 correspond to the complex ratio of electric-to-acoustic signal transfer functions measured on the z-axis indicated in FIGS. 5-6. The complex ratio can be expressed as:

$$C.R.(j\omega) = \frac{H_2(j\omega)}{H_1(j\omega)}$$

where $H_1(j\omega)$ is the steady state frequency response of a first loudspeaker, and $H_2(j\omega)$ is the steady state frequency response of a second loudspeaker.

Although in principle multiplication by the complex ratio for each frequency corrects the difference between the electric-to-acoustic transfer functions of two loudspeakers, in practice it would be unnecessarily cumbersome to transform discrete audio signals into the frequency domain, multiply by the complex ratio and transform the result back to the time domain for driving a loudspeaker. It is more practical to use a time domain filtering approach. A second plot 704 in the graph 700 is the magnitude versus frequency response of a time domain filter, in particular an Infinite Impulse Response (IIR) filter, that has been synthesized in order to approximate the aforementioned complex ratio as a function of frequency. A second plot 804 in graph 800 is the phase versus frequency response of the synthesized time domain filter. Although the filter described by the second plots 704, 804 is an IIR filter, alternatively Finite Impulse Response (FIR) filters are used. Moreover, in lieu of a digital filter, an analog filter is alternatively used. However, a digital filter lends itself to implementation in modern microprocessor based devices.

To design a filter that approximates the frequency dependent complex ratio of the electric-to-acoustic transfer functions existing filter synthesis algorithms are suitably used. For IIR type filters the commercial invfreqz.m algorithm of the MATLAB signal processing toolbox is appropriately used in synthesizing IIR filters to be used in the embodiments described herein. MATLAB is a software application for performing engineering calculations that is published by Mathworks of Natick, Mass. Many variations of algorithms for synthesizing IIR filters that are suitable are known in the published literature. For example appropriate IIR filter synthesis algorithms are described in "Discrete-Time Signal Processing second edition" Chapter 7 by Oppenheim & Schafer and in "Signal Processing Toolbox User's Guide Version 5" by The Math Works Inc.

Once a filter design has been synthesized, a corresponding filter is implemented in the cellular telephone 100. Signals applied to one of the loudspeakers 402, 404 (the one corresponding to the denominator in the complex ratio) are processed by the filter before being applied to the loudspeaker. Doing so equalizes the electric-to-acoustic signal transfer functions so that even though the two loudspeakers 402, 404 are different in design, the electric-to-acoustic transfer functions including the filter, will be approximately equal on the positive Z axis shown in FIGS. 5 and 6. This results in constructive interference between the monopole response 602 and the upper lobe 502 of the dipole response. Likewise, there is destructive interference between the monopole response 602 and the lower lobe 504 of the dipole response due to the 180 degree shift in phase between the two dipole lobes 502,504. The resulting directivity plot of the acoustic system is shown in FIG. 9.

When a filter that is computed with a 180 degree phase shift of the ratio of the electric-to-acoustic signal transfer functions of the loudspeakers 402, 404 is used, there will be a destructive interference effect that is particularly strong at the angle at which the electric-to-acoustic signal transfer functions were determined, the positive z-axis. Furthermore, in as much as the acoustic field of by the first loudspeaker 402 is, roughly speaking, anti-symmetric in regard to phase, in a direction opposite to that in which a strong destructive interference effect obtains, a strong constructive interference effect will obtain. In making practical use of the foregoing destructive and constructive interference, the loudspeakers 402, 404 are physically oriented and the angle used in calculating the filter chosen, such a direction in which strong constructive interference obtains is oriented toward a user of the cellular telephone 100 or other device, and a direction in which strong destructive interference obtains is oriented away from the user. A benefit of such an arrangement is that the amplitude of sound reaching the user from the loudspeaker accessory 200 is reinforced, while the amplitude of sound that reaches other persons situated in back of the cellular telephone 100 is reduced. This 180 degree shift in the phase of the filter will produce a directivity pattern shown in FIG. 10.

Figure 9:
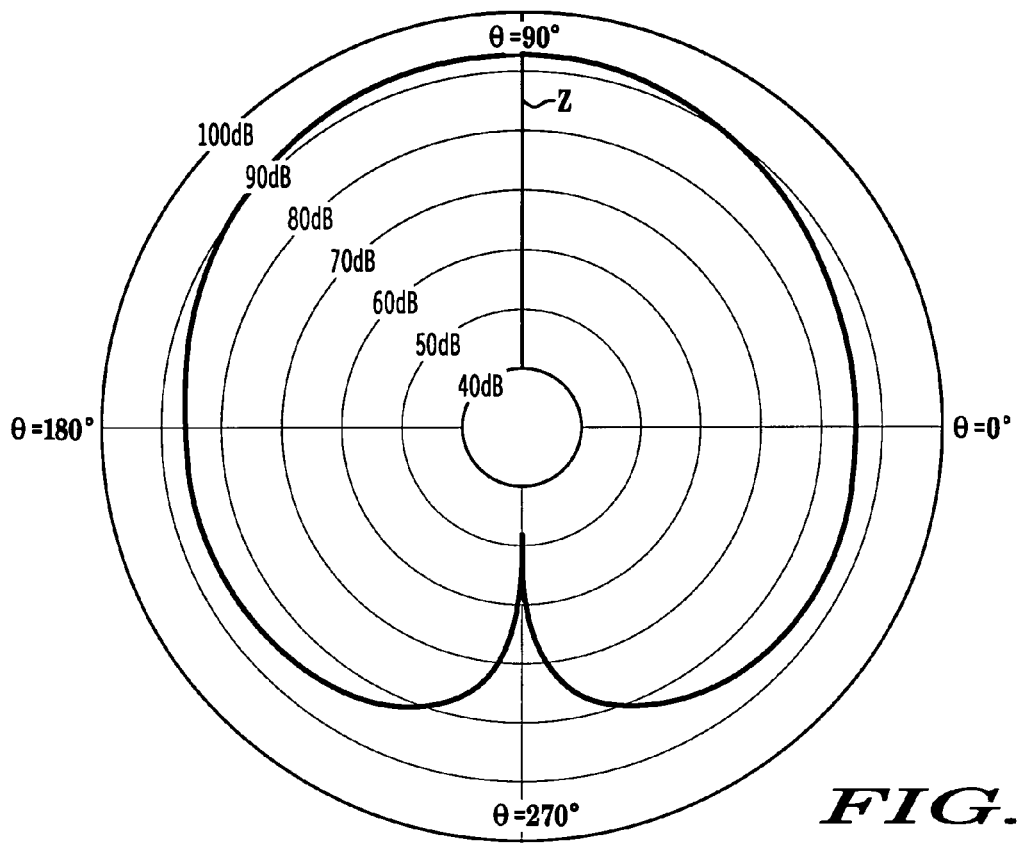
FIGS. 9-12 are polar sound pressure level plots in decibels for the loudspeaker accessory shown in FIGS. 2-4 when driving both loudspeakers with variously filtered signals applied to one loudspeaker.

FIG. 9 is a simulated polar sound pressure level plot for the loudspeaker accessory 200, when operating in the configuration shown in FIG. 3 with the lid 204 deployed, and with filtering designed to obtain destructive interference behind the cellular telephone 100, applied to a signal applied to one of the loudspeakers 402, 404. Note that in FIG. 9 the radial coordinate which gives sound pressure level is marked off in decibels. As shown in FIG. 9 strong destructive interference obtains in the direction of the negative z-axis (downward at 270 (−90) degrees in the coordinate system of FIG. 9). Conversely, strong constructive interference obtains in the direction of the positive z-axis (upward at 90 degrees in the coordinate system of FIG. 9). Over a range of solid angle hemisphere that is centered on the negative z-axis, the sound pressure level is at least 6 dB below the sound pressure level obtained in the direction of the positive z-axis. Thus, in the case that the loudspeaker accessory 200 is oriented such that the positive z-axis (at 90 degrees in the coordinate system of FIG. 9) were oriented toward the user, the user would hear sound from the loudspeaker accessory at a relatively high level compared to persons standing behind the loudspeaker accessory 200.

The direction of the peak and null of the directivity pattern can be steered off of the z-axis while the speakers maintain their fixed orientation by applying an equal phase shift to each frequency of the filter's response.

A simple case of steering maximum sound pressure level in a direction other than the direction of the positive z-axis is that of directing the maximum in the direction of the negative z-axis. If it is the case that the winding direction of the voice coils 428, the direction of the magnetic fields in the annular gaps 420 and the polarity connections to the loudspeakers is such that the diaphragms 422, 442 of the loudspeakers 402, 404 move in the same direction when the lid 204 is deployed and the same signal is applied to both loudspeakers 402, 404, then a destructive interference effect will occur in the downward direction in the perspective of FIG. 3 (the negative z-axis direction). In order to steer the maximum sound pressure level to approximately the direction of the negative z-axis, by causing constructive interference to occur in the direction of the negative z-axis a phase shift of 180 degrees is applied at each frequency to an electrical signal used to drive one of the loudspeakers 402, 404. In order to realize a time domain filter (e.g., FIR, IIR filter) that effects the 180 degree phase shift, a 180 degree phase shift (multiplication by −1) is applied to the complex quantities that characterize the ratio of the frequency dependent electric-to-acoustic signal transfer functions of the two loudspeakers in the direction of the positive z-axis. Thereafter these new complex ratios of the transfer functions at each frequency are input to a filter synthesis algorithm as previously described.

Figure 10:
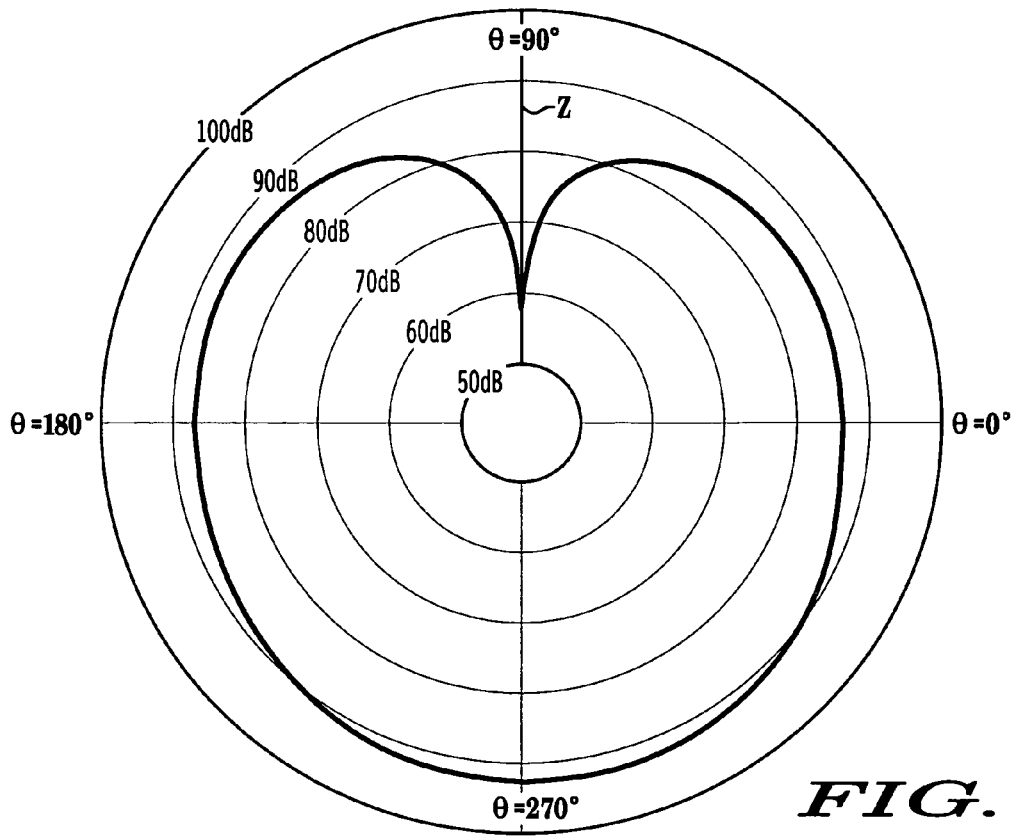

FIG. 10 shows a polar sound pressure level plot for the loudspeaker accessory 200 when operating with the lid 204 deployed and using a filter designed according to the foregoing prescription, in order to filter a signal applied to one of the loudspeakers. As shown in FIG. 10 the maximum sound pressure level is approximately in the direction of the negative z-axis, and a minimum sound pressure level caused by destructive interference occurs in the direction of the positive z-axis.

Beyond the simple case of simply reversing the directions of maximum and minimum sound pressure level, the maximum and minimum in sound pressure level can be steered. According to one embodiment, this is done as follows. Complex quantities that characterize the electric-to-acoustic signal transfer functions of each of the loudspeakers 402, 404 at each frequency, along the z-axis are determined. Thereafter, for each frequency, a rotation of the phase of the complex ratio of the loudspeakers' transfer functions is determined, such that a maximum or minimum of sound pressure is steered to a desired angle. The rotation of the phase necessary to steer the maximum intensity in a given direction is suitably determined by routine experimentation or simulation in which different rotations of the phase are tried in order to identify a phase rotation which achieves the desired steering.

The complex ratios with phases rotated to achieve the desired steering are then used to synthesize a filter as previously described. The filter obtained is then used to filter the signal applied to the loudspeaker corresponding to the denominator in the ratios used in synthesizing the filter. The filter will cause a frequency dependent phase delay that will tend to steer the maximum sound pressure level in a particular direction. In order to be able to select a steering angle multiple filters for multiple angles are determined according to the foregoing method, and stored in a memory for later use.

In achieving the sound radiation patterns depicted in FIGS. 9, 10 the relative amplitude of the signals applied to the two loudspeakers 402, 404 is adjusted so that the sound pressure levels are equal in the directions of the positive and negative z-axis respectively. It is however, possible, by varying relative signal strengths, to vary the degree of directionality of the loudspeaker accessory 200, and other loudspeakers systems described herein below, between a omnidirectional pattern through cardioid, super-cardioid, and hypercardioid to a bidirectional pattern. To achieve an omnidirectional pattern the dipole loudspeaker is not driven. To achieve the cardioid pattern shown in FIGS. 9-10, the relative amplitude of signals used to drive the monopole 404 and dipole 402 speakers is adjusted to produce the same on axis acoustic output. To achieve a hypercardioid the relative amplitude of signals used to drive the monopole 404 and the dipole 402 speakers is adjusted to obtain a 3:1 ratio between the dipole 402 and the monopole 404 output on the z-axis. In order to achieve a super-cardioid the relative amplitude of signals used to drive the dipole 402 and the monopole 404 loudspeakers is adjusted to obtain a 1.7:1 ratio between the dipole 402 and the monopole 404 output on the z-axis. These ratios can be obtained in the device through gain applied in digital signal processing, in preamplifier, or amplifier circuitry. The degree of directionality can be varied in response to user input.

Figure 11:
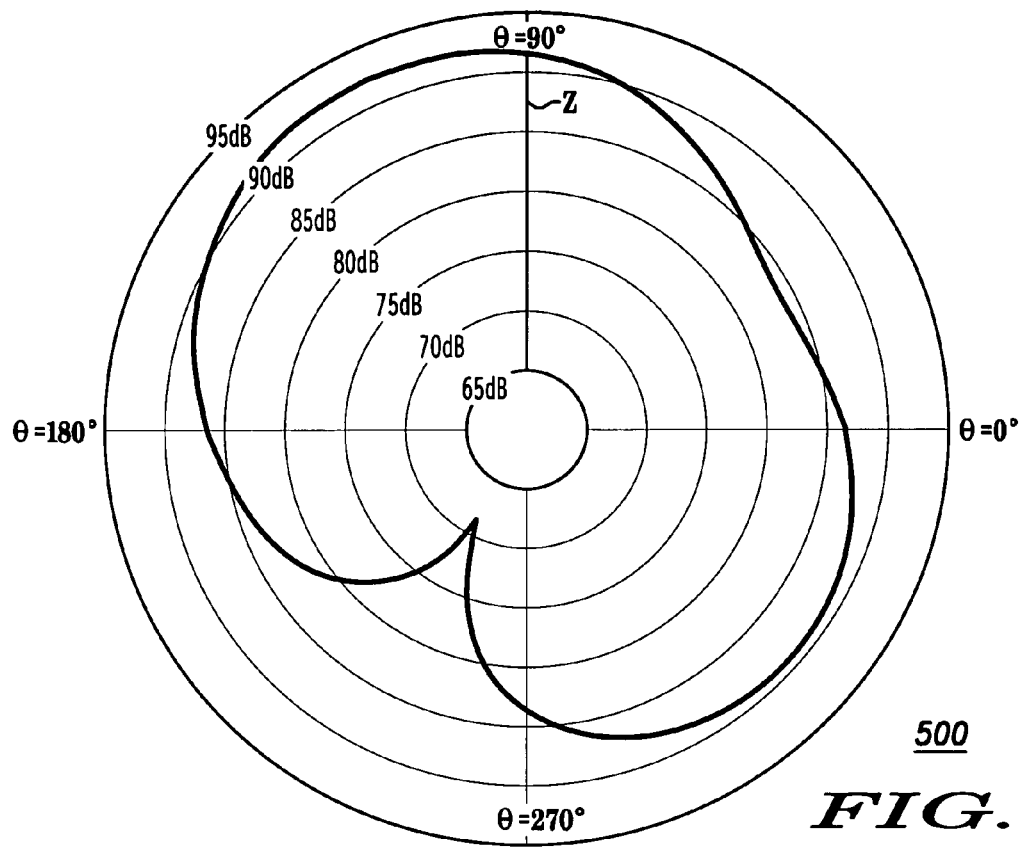
Figure 12:
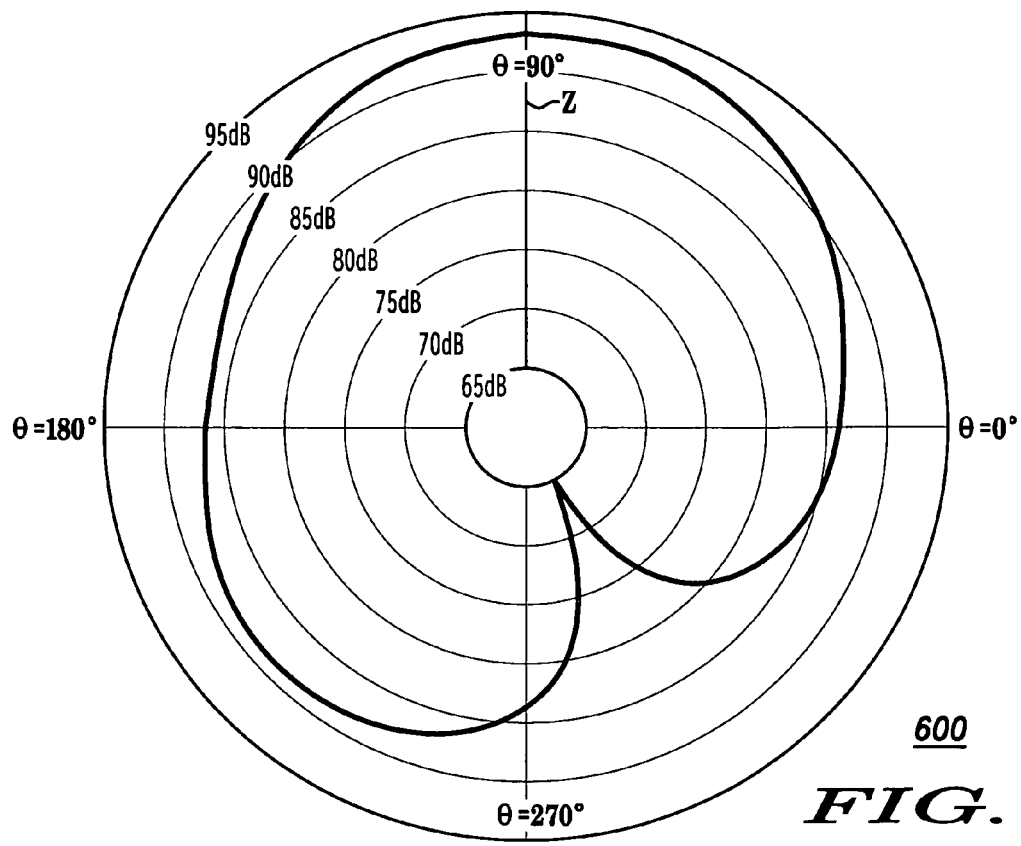

FIGS. 11, 12 show polar sound pressure level plots for the loudspeaker accessory 200 when operating with the lid 204 deployed and using filters designed to steer the maximum and minimum sound pressure levels in off-axis directions.

One way to facilitate steering sound radiated by the loudspeaker accessory 200, is to store in the cellular telephone 100 multiple sets of time domain (e.g., IIR, FIR) filter coefficients, each of which is designed to steer sound in a different direction. Then, in use, a microphone array is used to detect the position of the user, and one of the sets of time domain filter coefficients is chosen, based on the position of the user, in order to steer sound radiated by the loudspeaker accessory 200 toward the user.

Another mode of operation of the loudspeaker accessory 200 can be used when the lid 204 is closed, i.e. rotated onto the cylindrical housing 202. The loudspeakers 402, 404 can be driven with appropriately phased signals, such that the diaphragms 422, 442 of the two loudspeakers 402, 404 move in synchronization. This configuration and mode of operation is known in the art as an isobarik configuration. In this case loudspeaker accessory 200 functions as a omnidirectional monopole loudspeaker with enhanced power, and low frequency response.

Given the location of the hinge 206 of the loudspeaker accessory 200 as shown in FIG. 2, when the cellular telephone 100 is held vertically and the lid 204 is opened the first loudspeaker 402 will be located below the second loudspeaker 404. In this case if the beam is steered, the elevation angle of the sound intensity extremums is changed.

According to an alternative embodiment the hinge 206 is moved by about 90 degrees to the side of the loudspeaker accessory 200, so that when the lid 204 is deployed, the first 402, and second 404 loudspeakers are located side by side. In this latter embodiment when the output of the loudspeaker accessory 200 is steered, as described above, it is the azimuths of the sound extremums that is altered.

Although it is expeditious to process the electrical signal to be applied to one of loudspeakers 402, 404 by a filter that compensates for differences between the electric-to-acoustic transfer function of that loudspeaker and the remaining loudspeaker, and to apply the electrical signal without processing by the filter to the remaining loudspeaker, alternatively the signal applied to each loudspeaker is filtered by one of a pair of filters designed to match the electric-to-acoustic transfer functions of the two loudspeakers 402, 404. For example, such a pair of filters could be designed to adjust the electric-to-acoustic signal transfer functions of the two loudspeakers 402-404 to an intermediate, of the two electric-to-acoustic signal transfer functions. In an alternative embodiment in which filtering is used for both speakers such filtering is also used to correct undesired frequency response characteristics.

Figure 13:
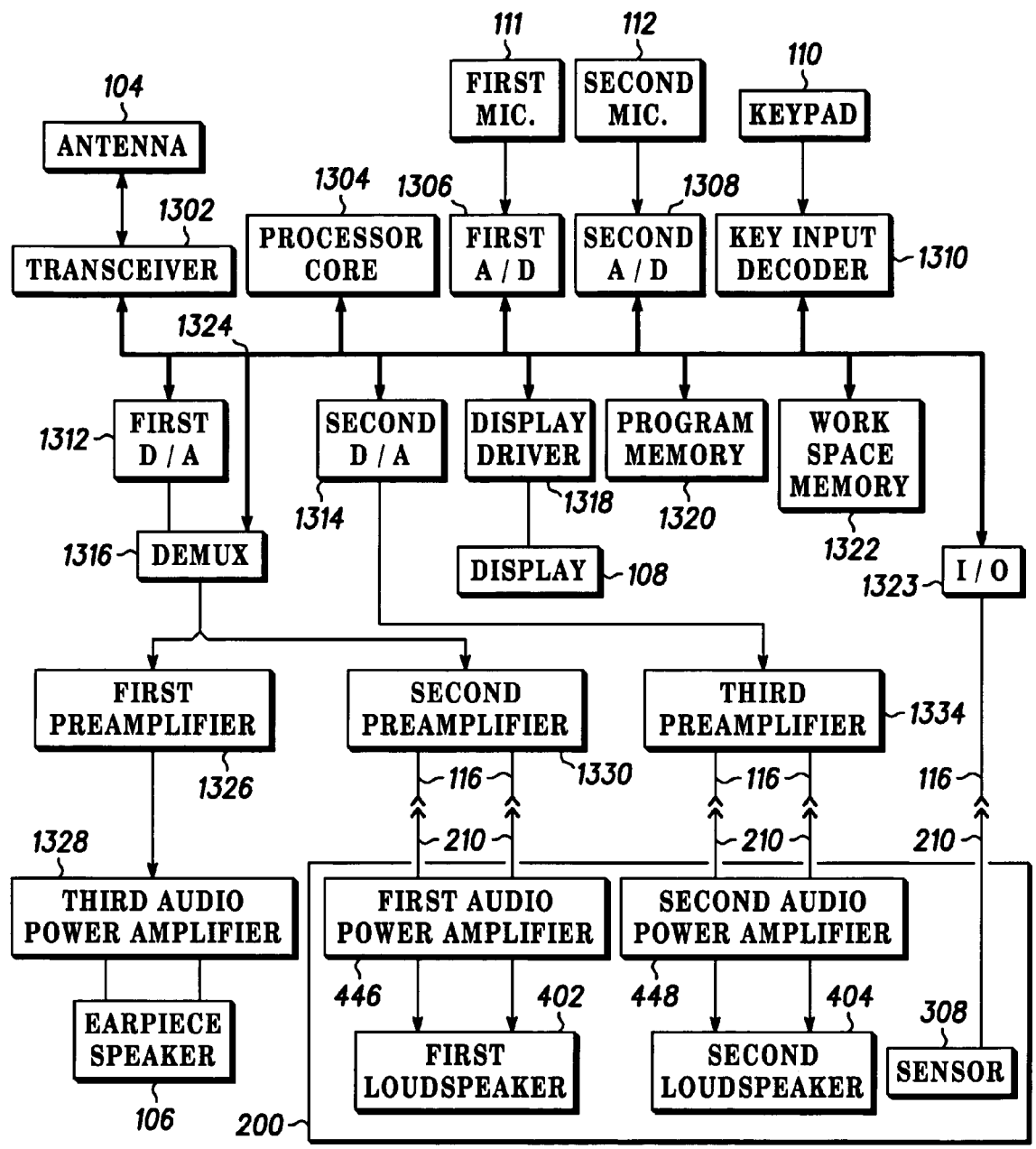
FIG. 13 is an electrical schematic in block diagram form of the cellular telephone and loudspeaker accessory shown in FIGS. 1-4.

FIG. 13 is an electrical schematic in block diagram form of the cellular telephone 100 and the loudspeaker accessory 200 shown in FIGS. 1-4. As shown in FIG. 13, the cellular telephone 100 comprises a transceiver module 1302, a processor core 1304, a first analog-to-digital converter (A/D) 1306, a second A/D 1308, a key input decoder 1310, a first digital-to-analog converter (D/A) 1312, a second D/A 1314, a demultiplexer 1316, a display driver 1318, a program memory 1320, a work space memory 1322 and a input/output (I/O) interface 1323 coupled together through a digital signal bus 1324.

The transceiver module 1302 is coupled to an antenna 104. Carrier signals that are modulated with data, e.g., digitally encoded voice audio, pass between the antenna 104, and the transceiver module 1302.

The first microphone 111 is coupled to the first A/D 1306, and the second microphone 112 is coupled to the second A/D 1308. Audio, including spoken words, is input through the microphones 111,112 and converted to streams of digital samples by the analog-to-digital converters 1306, 1308. A direction of arrival (DOA) algorithm stored in the program memory 1320 and executed by the processor core 1304 processes the streams of digital samples in order to determine the direction from which the user's voice reaches to the cellular telephone 100. Thus, the direction in which the user is located relative to the cellular telephone 100 is determined. Using the two microphones 111, 112 located one above the other as shown in FIG. 1, the elevation angle of the user is determined. Knowing the elevation angle allows the maximum sound pressure level of the loudspeaker accessory 200 to be steered toward the user. Alternate embodiments can utilize more than two microphones to determine both altitude and azimuth of the user relative to the device.

In the aforementioned alternative embodiment in which the hinge 206 of the loudspeaker accessory 200 is moved so that the two loudspeakers 402, 404 will be side by side when the lid 204 is opened, it is also appropriate to locate the two microphones 111, 112 side by side, as opposed to one above the other as shown in FIG. 1. With the microphones 111, 112 located side by side the DOA algorithm is used to determined the azimuth of the user and loudspeakers 402, 404 are driven to steer the azimuth of maximum sound intensity output by the loudspeaker accessory 200 toward the user.

Referring again to FIG. 13, the keypad 110 is coupled to the key input decoder 1310. The key input decoder 1310 serves to identify depressed keys, and provide information identifying each depressed key to the processor core 1304. The display driver 1318 is coupled to the display 108.

The first D/A 1312 is coupled through the demultiplexer 1316, a first preamplifier 1326, and a third audio power amplifier 1328 to the earpiece speaker 106. The first D/A 1312 is also coupled through the demultiplexer 1316, a second preamplifier 1330, and the first audio power amplifier 446 to the first loudspeaker 402. The demultiplexer 1316 under the control of the processor core 1304 selectively routes signals output by the first D/A 1312 to the first preamplifier 1326 or the second preamplifier 1330. The second D/A 1314 is coupled through a third preamplifier 1334, and the second audio power amplifier 448, to the second loudspeaker 404. The second 1330 and third 1334 preamplifiers are coupled to the first 446 and second 448 audio power amplifiers through the first 116, and second 210 plurality of contacts of the electrical plug 208 and the accessory electrical connector socket 114.

The audio power amplifiers 1328, 446, 448 provide drive signals for driving the earpiece speaker 106, and the loudspeakers 402, 404. The digital-to-analog converters 1312-1314 convert digital signal samples to analog drive signals that are amplified by the preamplifiers 1326, 1330, 1334 and the audio power amplifiers 1328, 446, 448 and drive the earpiece speaker 106, and the loudspeakers 402, 404.

The processor core 1304 is coupled through the I/O interface 1323 to the sensor 308, allowing the processor core to read the position of the lid 204.

The processor core 1304, programmed by signal processing programs stored in the program memory 1320, in combination with each of the digital-to-analog converters 1312-1314, associated preamplifiers 1326, 1330, 1334 and audio power amplifiers 1328, 446, 448 is a form of drive circuit for one of the speakers 106, 402, 404. Alternatively, analog drive circuits and/or loudspeaker drive circuits based on fixed (non-programmable) digital circuitry are used.

One or more programs for generating electrical signals for driving the first loudspeaker 402 and second loudspeaker 404 are stored in the program memory 1312, and executed by the processor core 1304. In the case that digital filtering (e.g., IIR, FIR filtering) is used, one or more sets of time domain filter coefficients are also stored in the program memory 1320.

In operation, a signal generated by the sensor 308, or alternatively generated by input from the keypad 110 or other user input is read by the processor core 1304, and based on the signal, the processor core 1304 selects the appropriate mode for driving the loudspeaker accessory 200, i.e., omnidirectional mode, or directional mode. Omnidirectional mode is appropriate if the loudspeaker accessory 200 is being used to allow multiple users situated at different angles around the cellular telephone 100 to participate in a telephone conversation, whereas directional mode is appropriate if the loudspeaker accessory 200 is being used to allow a single user to hear the telephone from a small distance, e.g., if the cellular telephone 100 is secured by a holder on a vehicle dashboard, or if the user holds the cellular telephone 100 in front of their face as one would hold a walkie-talkie.

In omnidirectional mode the processor core 1304 will generate signals for the loudspeakers 402, 404 that are phased so that the diaphragms 422, 442 of the loudspeakers 402, 404 will be substantially synchronized such that an isobarik configuration will be established by the diaphragms 422, 442.

In directional mode, the processor core 1304 will generate two separate signals for the two loudspeakers 402, 404 where one of the signals is a filtered version of the other with filtering such as described above with reference to FIGS. 7-12. In the case that beam steering is implemented in the cellular telephone 100, the processor core 1304 will choose a set of time domain filter coefficients to steer the maximum amplitude of the sound output by the loudspeaker accessory 200 to a particular direction based on the output of the DOA algorithm that determines the direction of the user by processing output of the microphones 111, 112.

In both modes, wireless signals that include encoded voice audio are received by the transceiver 1302 via the antenna 104. The wireless signals are demodulated by the transceiver 1302. The transceiver 1302 also optionally handles certain decoding operations such as channel coding decoding. A digital data stream including the received voice audio is passed to the processor core 1304 which handles any remaining decoding such as voice encoder (vocoder) decoding in order to extract raw audio sample streams. The audio sample streams can then be replicated and at least one copy that is to be used to drive one of the loudspeakers 402, 404 processed by a time domain digital filter such as described above in the context of FIGS. 7-12. The audio sample streams are then applied to the digital-to-analog converters 1312-1314 in order to drive the preamplifiers 1326,1330, 1334 which in turn drive the audio power amplifiers 1328, 446, 448 which in turn drive the earpiece speaker 106, and the loudspeakers 402, 404.

In the case that control over the degree of directionality is implemented in the cellular telephone 100, in response to user input, the processor core will adjust the relative amplitudes of the signal applied to the loudspeakers 402, 404 in order to control the degree of directionality as discussed above.

The program memory 1320 is also used to store programs that control other aspects of the operation of the cellular telephone 100. The program memory 1320 is a form of readable medium.

According to an alternative embodiment of the invention, the cellular telephone 100 comprises a digital signal processing (DSP) accelerator module such as a multimedia accelerator module that is well adapted for performing signal filtering operations such as multiply and accumulate operations. In such an alternative embodiment, it would be advantageous to use the DSP accelerator module to handle DSP operations such as signal filtering.

Figure 14:
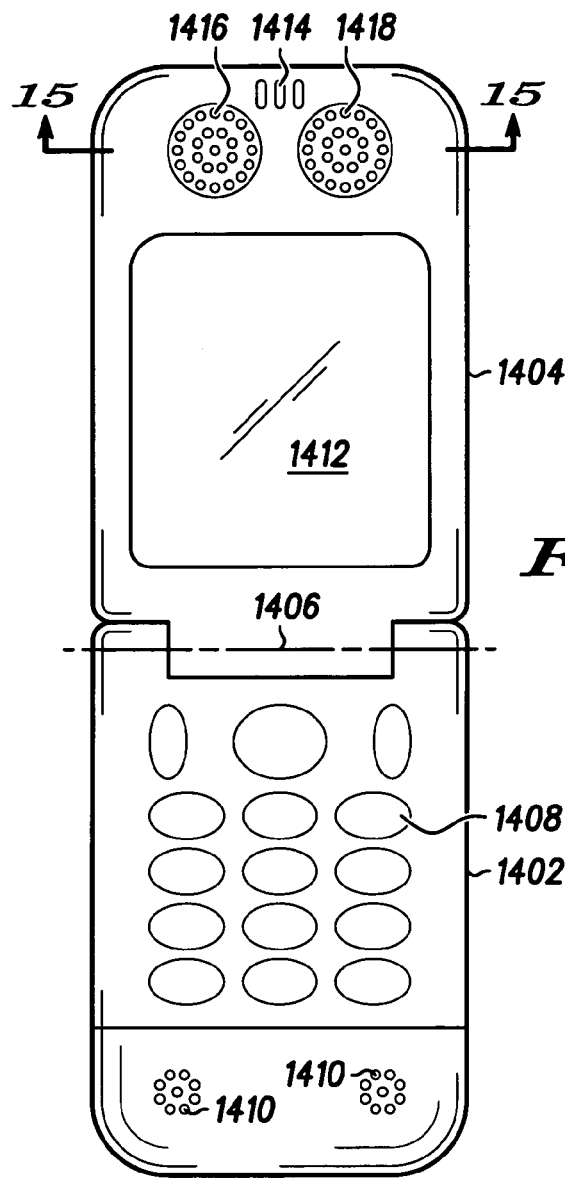
FIG. 14 is a front view of a second embodiment of a cellular telephone that includes an improved loudspeaker system.

FIG. 14 is a front view of a second embodiment of a cellular telephone 1400 that includes an improved loudspeaker system. The second cellular telephone 1400 comprises a bottom half 1402 and a top half 1404 that are connected by a hinge 1406. The bottom half 1402 includes a keypad 1408, and a pair of microphones 1410. Alternatively, more than two microphones are included. However, the bottom half need only include one microphone if automated steering of the loudspeaker audio is not desired. The microphones 1410 are used to determine the angular coordinate of a user relative to the second cellular telephone 1400. The top half 1404, includes a display 1412, an earpiece speaker 1414 and the improved loudspeaker system which is described below.

Figure 15:
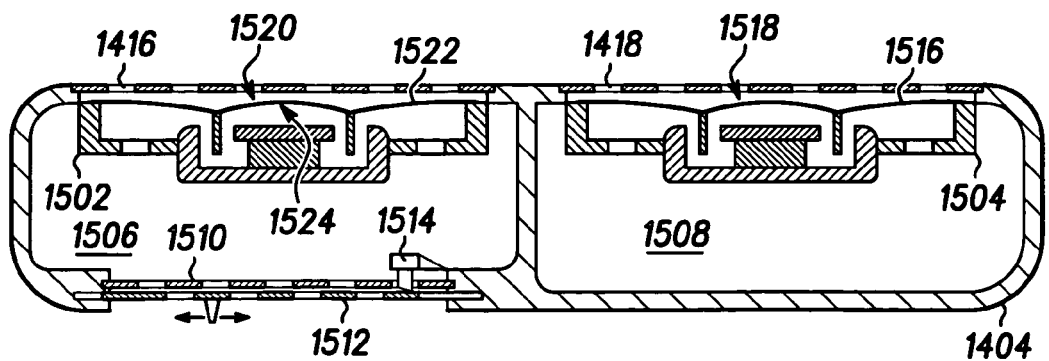
FIG. 15 is a cross-sectional view of a top half of the cellular telephone shown in FIG. 14 showing two loudspeakers and associated acoustic structure.

FIG. 15 is a cross-sectional view of the top half 1404 of the cellular telephone 1400 shown in FIG. 14 showing a pair of loudspeakers 1502, 1504 and associated acoustic structure. The pair of loudspeakers includes a first loudspeaker 1502 and a second loudspeaker 1504. A first air cavity 1506 and a second air cavity 1508 are defined in the top half 1404. The first air cavity 1506 includes a first foraminous wall (loudspeaker grill) 1416, and the second air cavity 1508 includes a second foraminous wall (loudspeaker grill) 1418. The first loudspeaker 1502 is mounted within the first air cavity 1506 under the first foraminous wall 1416 and the second loudspeaker 1504 is mounted in the second air cavity 1508 under the second foraminous wall 1418. The second air cavity 1508 having a fixed configuration acts as a fixed acoustic compliance or acoustic enclosure for the second loudspeaker 1504. The first air cavity 1506 also includes a closeable acoustic port 1510 that leads to the surrounding environment. The closeable acoustic port 1510 is located opposite the first foraminous wall 1416. The closeable acoustic port 1510 includes a sliding door 1512. The sliding door 1512 actuates a sensor switch 1514 that is coupled to a processor (not shown) of the second cellular telephone 1400 and is used to alter the manner in which the pair of loudspeakers 1502, 1504 are electrically driven in response to the state of the closeable acoustic port 1510.

In as much as the configuration of the second air cavity 1508 is fixed, the second loudspeaker 1504 always operates as a monopole loudspeaker. The second loudspeaker has a diaphragm 1516 with only a single surface 1518 that is coupled to air surrounding the cellular telephone 1400.

In contrast, the first air cavity 1506 has two configurations. With the acoustic port 1510 closed, only a top surface 1520 of a diaphragm 1522 of the first loudspeaker 1502 is acoustically coupled to air surrounding the cellular telephone 1400. When the closeable acoustic port 1510 is closed, the first air cavity 1506 acts as a fixed acoustic compliance or acoustic enclosure for loudspeaker 1502 and the first loudspeaker 1502 operates as a monopole loudspeaker source. Thus, when the acoustic port 1510 is closed both loudspeakers 1502, 1504 are configured as monopoles and both are suitably driven with the same signal. The diameters of the diaphragms 1516, 1522 are a small fraction of the smallest wavelengths included in voice audio that is limited, as is typical, to a few thousand Hertz. Consequently, voice audio emitted by the two loudspeakers 1502, 1504 will be substantially omnidirectional. In this configuration, the two loudspeakers will both contribute to the radiated power, without destructive interference.

On the other hand when the acoustic port 1510 is opened both the top surface 1520, and a bottom surface 1524 of the diaphragm 1522 of the first loudspeaker 1502 are coupled to air outside the cellular telephone 1400, the bottom surface 1524 being coupled through the acoustic port 1510. In this case the first loudspeaker 1502 will function as a dipole loudspeaker radiating two oppositely phased acoustic fields analogous to those discussed above in connection with FIG. 5. In this case filtering analogous to that described above in connection with FIGS. 7-9, or analogous to that described with reference to FIGS. 7, 8, 10-12 is suitably applied to the signal applied to one of the two loudspeakers 1502, 1504 in order to generate a more directional acoustic field. (Filtering applied to the dipole loudspeaker serves to flatten the rising frequency response characteristic of a dipole source). Using filtering as described above, a maximum in sound amplitude can be emitted from the front of the cellular telephone 1400 so that a relatively high sound pressure level reaches the user facing the cellular telephone 1400 and weaker sound pressure level reaches others behind or to the side of the cellular telephone 1400.

The electrical circuitry of the second embodiment cellular telephone 1400 is analogous to that of the first cellular telephone 100 depicted in FIG. 13 and described above.

Figure 16:
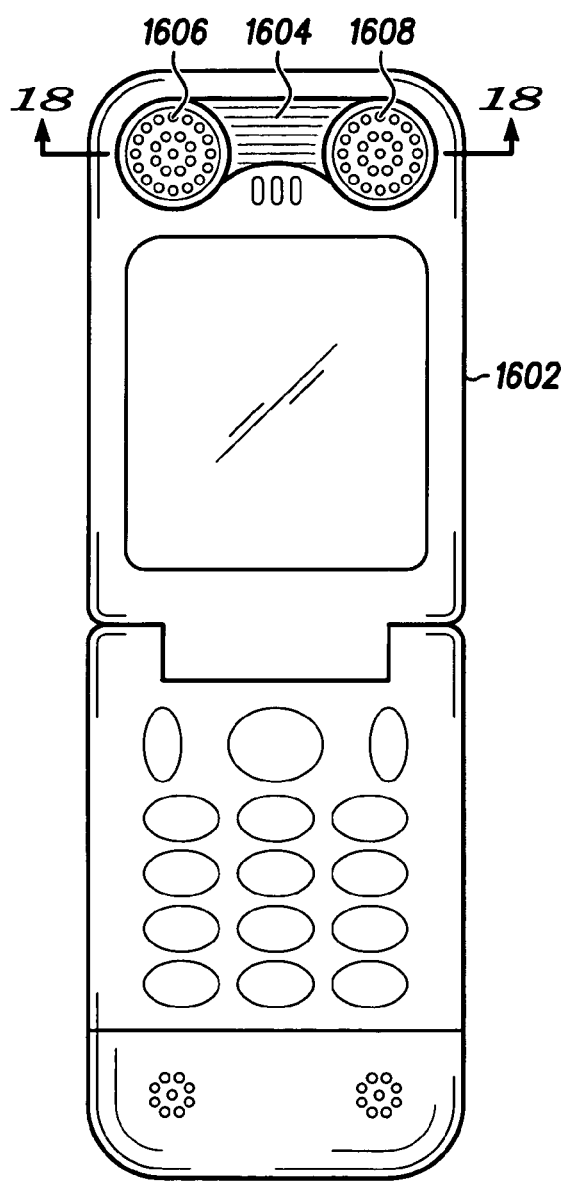
FIG. 16 is a front view of third embodiment of a cellular telephone that includes an improved loudspeaker system.
Figure 17:
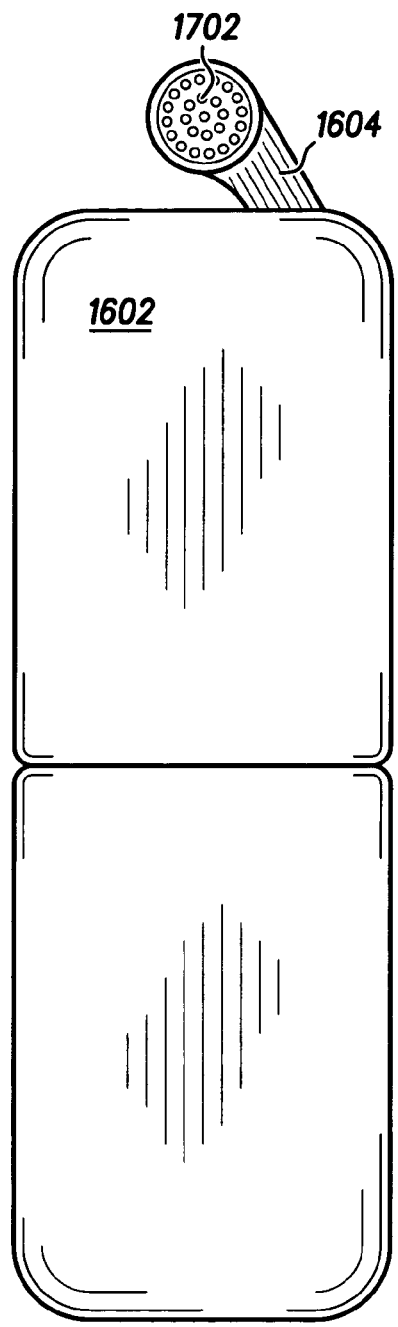
FIG. 17 is a back view of the cellular telephone shown in FIG. 16.

FIG. 16 is a front view and FIG. 17 a back view of a third embodiment of a cellular telephone 1600 that includes an improved loudspeaker system. In as much as the general features of the third cellular telephone 1600 other than the loudspeaker system are similar to the second cellular phone 1400, a description of the general features will not be reiterated here.

Figure 18:
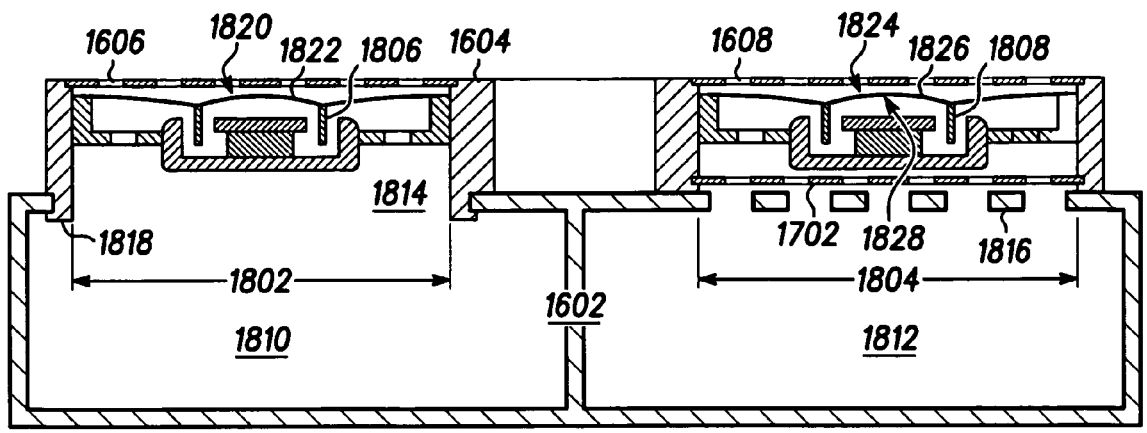
FIG. 18 is a cross-sectional view of a top half of the cellular telephone shown in FIGS. 16-17 showing two loudspeakers and associated acoustic structure.

Like the second cellular telephone 1400, the third cellular telephone 1600 is also a clamshell type cellular phone. Like the second cellular telephone 1400, the improved loudspeaker system of the third cellular telephone 1600 is also built into a top half 1602, of the third cellular telephone 1600. FIG. 18 is a cross-sectional view of a portion of the top half 1602 of the third cellular telephone 1600 including the improved loudspeaker system. The section plane of FIG. 18 is indicated in FIG. 16.

Referring to FIGS. 16-18, the cellular telephone 1600 includes a loudspeaker holder 1604 that is pivotally attached to the top half 1602. The loudspeaker holder 1604 includes a first bore 1802 and a second bore 1804. A first loudspeaker 1806 is located in the first bore 1802 and a second loudspeaker 1808 is located in the second bore 1804. A first loudspeaker grill 1606 is located in front of the first loudspeaker 1806, a second loudspeaker grill 1608 is located in front of the second loudspeaker 1808 and a third loudspeaker grill 1702 is located behind the second loudspeaker 1808.

A first acoustic cavity 1810 and a second acoustic cavity 1812 are defined in the top half 1602. The first acoustic cavity 1810 includes an opening 1814. The second acoustic cavity 1812 includes a foraminous wall area 1816. The opening 1814 of the first cavity 1810 and the foraminous wall area 1816 of the second acoustic cavity 1812 are coplanar and are spaced from each other by a certain distance d, that is equal to the distance between the first bore 1802, and the second bore 1804 of the loudspeaker holder 1604. The foraminous wall area 1816 comprises a plurality of openings. The loudspeaker holder 1604 includes a bearing flange 1818 that is rotatably engaged in the opening 1814 of the first cavity 1810. The first loudspeaker 1806 is held in alignment with the opening 1814 of the first acoustic cavity by the bearing flange 1818.

The loudspeaker system of the third cellular telephone 1600 is also reconfigurable. In a first configuration shown in FIGS. 16, 18, the loudspeaker holder 1604 is rotated such that the second loudspeaker 1808 is located over the foraminous wall area 1816 of the second cavity 1812. In the first configuration only a front surface 1820 of a diaphragm 1822 of the first loudspeaker 1806 and a front surface 1824 of a diaphragm 1826 of the second loudspeaker 1808 are coupled to air surrounding the cellular telephone 1600. In the first configuration both loudspeakers 1806, 1808 function as resonator backed monopole speakers. This configuration is useful for omnidirectional output of voice audio that is limited to a few thousand Hertz. (It is to be noted that in certain applications the loudspeaker system of the third cellular telephone or other embodiments may be used to output audio (e.g., MIDI ringtones) that includes higher frequency content).

In a second configuration shown in FIG. 17, the loudspeaker holder 1604 is rotated about the bearing flange 1818 to an orientation in which the second bore 1804 including second loudspeaker 1808 is displaced from the top half 1602, so that both the front surface 1824 and a back surface 1828 of the diaphragm 1826 of the second loudspeaker 1808 are coupled to air surrounding the cellular telephone 1600. In the second configuration the first loudspeaker 1806 operates as a monopole loudspeaker as in the first configuration, but the second loudspeaker 1808 operates as a dipole loudspeaker. In the second configuration using appropriate filtering such as described above with reference to FIGS. 7-12 radiated sound in one lobe of the output of the second loudspeaker 1808 can be use to cancel sound radiated by the first loudspeaker 1806 in order to obtain a more directed sound radiation pattern. In particular, a maximum in sound pressure level can be directed to a user in front of the cellular telephone 1600.

The electrical circuitry of the third embodiment cellular telephone 1600 is analogous to that of the first cellular telephone 100 depicted in FIG. 13 and described above.

Figure 19:
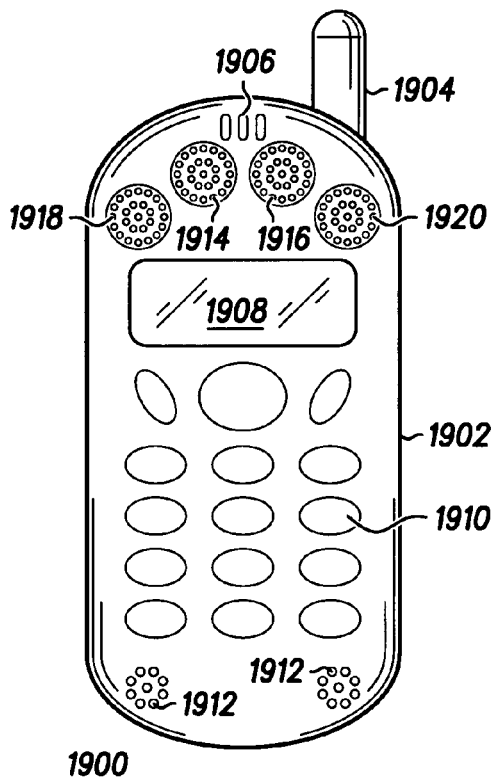
FIG. 19 is a front view of a fourth embodiment of a cellular telephone that includes an improved stereo loudspeaker system.
Figure 20:
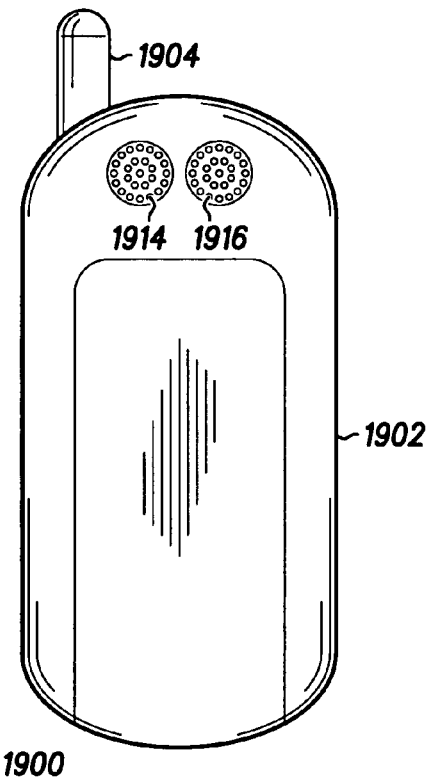
FIG. 20 is a back view of the cellular telephone shown in FIG. 19.

FIG. 19 is a front view and FIG. 20 is a back view of a fourth embodiment of a cellular telephone 1900 that includes an improved stereo loudspeaker system. The fourth cellular telephone 1900 is a so called 'candy bar' form factor cellular telephone. The fourth cellular telephone 1900 includes a housing 1902, that encloses and supports a plurality of components including an antenna 1904, an earpiece speaker 1906, a display 1908, a keypad 1910, a pair of microphones 1912, and a loudspeaker system described which is below. Alternatively, there is only a single microphone.

The loudspeaker system includes a first dipole loudspeaker 1914, a second dipole loudspeaker 1916, a first monopole loudspeaker 1918, and second monopole loudspeaker 1920. The dipole loudspeakers 1914, 1916 are coupled to the surrounding air at the front and rear of the telephone 1900, whereas the monopole speakers 1918, 1920 are only vented at the front of the telephone 1900. Each of the dipole speakers 1914, 1916 emits two oppositely phased acoustic waves in opposite directions as discussed above in reference to FIG. 3, and each of the monopole loudspeakers 1918 emits an omnidirectional acoustic wave, that is substantially isotropic in phase.

Figure 21:
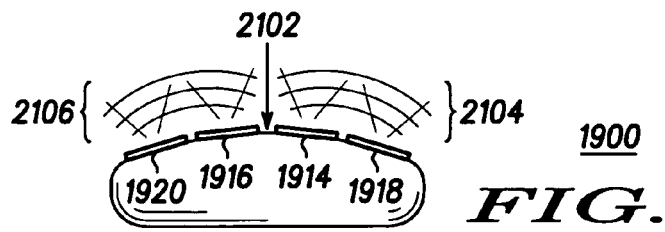
FIG. 21 is a top view of the cellular telephone shown in FIGS. 19-20 showing radiated stereo sound.

FIG. 21 is a top view of the cellular telephone 1900 shown in FIGS. 19-20 showing radiated stereo sound. As shown in FIG. 1900 a front surface 2102 of the housing 1902 is radiused such that the first dipole loudspeaker 1914 is canted toward the right (in the perspective of FIG. 21), and the second dipole loudspeaker 1916 is canted toward the left. Canting of the dipole loudspeakers 1914, 1916 assists in setting up to angularly separating acoustic fields 2104, 2106 that are produced by the loudspeakers. Alternatively the acoustic fields are separated by steering by phase shifting filtering such as described above in introducing FIGS. 11-12. The effect of pointing a directional loudspeaker in the general direction of a particular ear results in acoustic shading (or attenuation) to the opposing ear. The acoustic shading effect that the opposing ear is subjected to in conjunction with the user's innate head related transfer function provide a stereo image that appears wider than the actual spacing of the loudspeakers.

Figure 22:
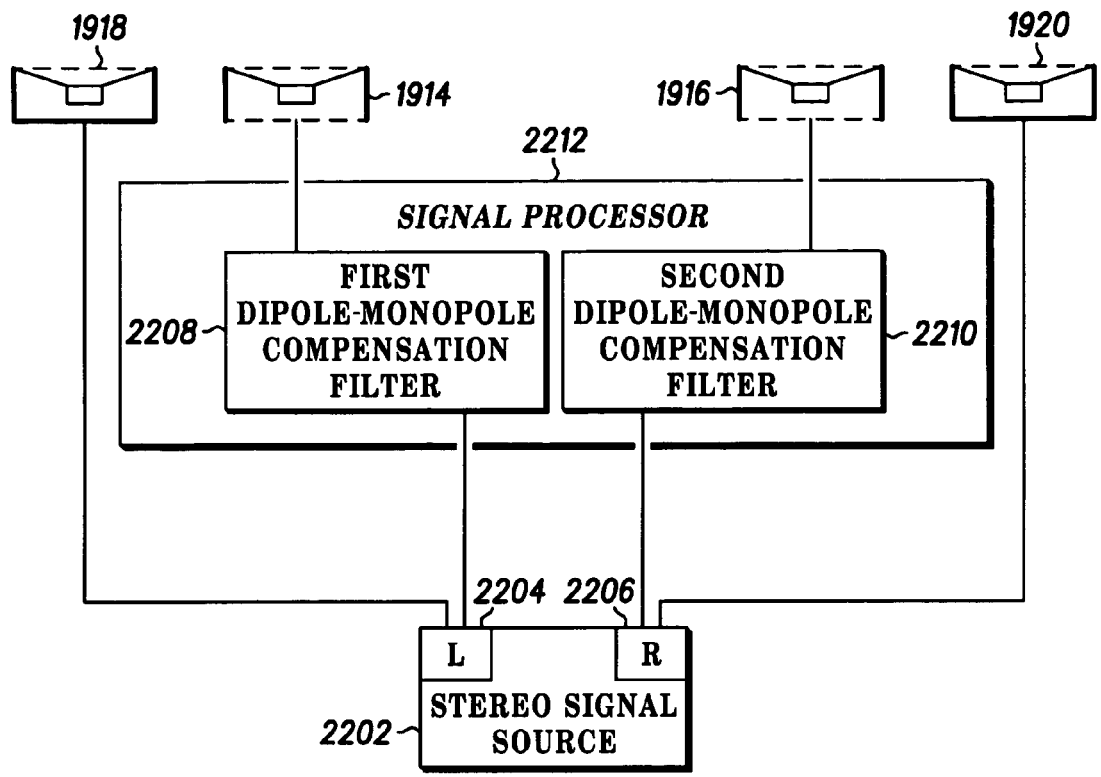
FIG. 22 is a schematic of a loudspeaker system of the cellular telephone shown in FIGS. 19-21.

FIG. 22 is a schematic of the loudspeaker system of the cellular telephone 1900 shown in FIGS. 19-21. As shown in the FIG. 22 the loudspeaker system comprises a stereo signal source 2202 that includes a left channel output 2204 and a right channel output 2206. The left channel output 2204 is coupled to the first monopole loudspeaker 1918, and is coupled, through a first dipole-monopole compensation filter 2208 to the first dipole loudspeaker 1914. Similarly, the right channel output 2206 is coupled to the second monopole loudspeaker 1920 and is coupled, through a second dipole-monopole compensation filter 2210 to the second dipole loudspeaker 1916. The electrical circuitry of the fourth embodiment cellular telephone 1900 is analogous to that of the first cellular telephone 100, however in the fourth cellular telephone 1900 additional digital-to-analog converters, preamplifiers and audio power amplifiers will be used for the additional loudspeakers.

The dipole-monopole compensation filters 2208, 2210, which are part of a signal processor 2212, operate as described above with reference to FIGS. 7-12. In particular the filters 2208, 2210 are designed to match (over a range of frequencies) the ratio of the electrical-to-acoustic signal response of the dipole loudspeakers 1914, 1916 to that of the monopole loudspeakers 1918, 1920 measured along the axis normal to the dipole loudspeaker diaphragm which results in destructive interference behind the cellular telephone 1900. In doing so, two separate frontward propagating directional acoustic fields 2104, 2106 are set up including a left channel acoustic field 2104 that is produced by the first dipole loudspeaker 1914, and the first monopole loudspeaker 1918, and a right channel acoustic field 2106 that is produced by the second dipole loudspeaker 1916, and the second monopole loudspeaker 1920. The compensation filters 2208, 2210 are suitably designed using the methodology described above in introducing FIGS. 11-12 to produce some angular separation between the acoustic fields 2104, 2106 such that the left acoustic field 2104 propagates at an angle toward the left, and the right acoustic field 2106 propagates at an angle toward the right. Angular separation of the acoustic fields can be achieved by such beam steering, or by canting the loudspeakers 1914-1920 as shown in FIG. 21 or a combination of the two.

If a user holds the cellular telephone 1900 in front of them, the left channel acoustic field 2104 will be more strongly coupled to user's left ear, and the right channel acoustic field 2106 will be more strongly coupled to the user's right ear, and thus the user will be able to experience stereo sound.

The stereo signal source 2202 and the signal processor 2212 including the dipole-monopole compensation filters 2208, 2210 are suitably embodied in a processor programmed by one or more programs, e.g., a digital audio decoder program, and an IIR filter program. Alternatively, such components are implemented in analog circuits and/or fixed (non-programmable) digital circuits.

Figure 23:
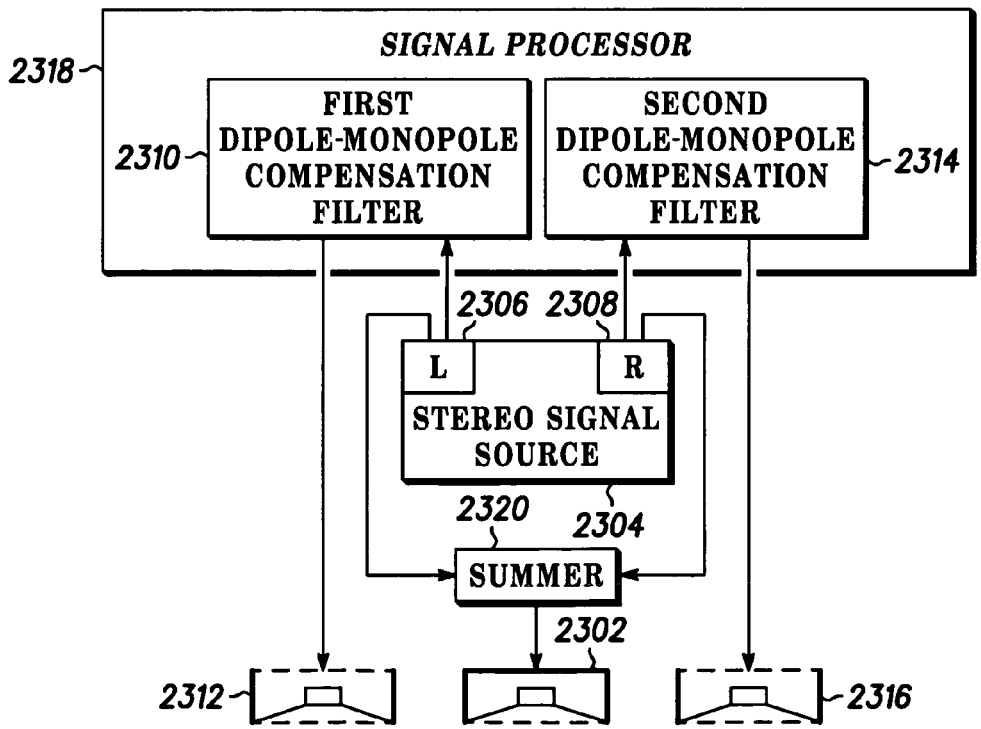
FIG. 23 is a schematic of a loudspeaker system of the cellular telephone shown in FIGS. 19-21 according to an alternative embodiment.

FIG. 23 is a schematic of a loudspeaker system 2300 according to an alternative embodiment. In contrast to the loudspeaker system shown in FIG. 22, the loudspeaker system shown in FIG. 23 comprises a single monopole speaker 2302. In common with the loudspeaker system shown in FIG. 22, the loudspeaker system shown in FIG. 23 also includes a stereo signal source 2304 including a left channel output 2306 and a right channel output 2308. The left channel output 2306 is coupled through a first dipole-monopole compensation filter 2310 to a first dipole loudspeaker 2312, and the right channel output 2308 is coupled through a second dipole-monopole compensation filter 2314 to a second dipole loudspeaker 2316. The dipole compensation filters 2310, 2314 are part of a signal processor 2318. The left 2306 and the right 2308 channel outputs are also coupled through a summer 2320 to the single monopole loudspeaker 2302. Signals from both the outputs 2306, 2308 excite omnidirectional audio waves that that are emitted by the monopole loudspeaker 2302. Angular separation of left and right channel audio waves is achieved by physically tilting the dipole speakers 2312, 2316 or by using the filters 2310, 2314 to phase shifting signals applied to the dipole loudspeakers 2312, 2316.

The stereo signal source 2304, signal processor 2318 and summer 2320 are suitably implemented as programs that are stored in memory and executed by a processor in a microprocessor based device such as shown in FIG. 13. Additional digital to analog converters, preamplifiers, and audio power amplifiers would be added to power the added dipole speaker included in the system 2300. The microprocessor, couple to the memory and the foregoing circuits would then constitute drive circuits for the loudspeakers 2302, 2312, 2116. Alternatively, fixed digital logic and/or analog circuits are used.

Although, cellular telephones have been described above, alternatively improved loudspeakers systems as described above are incorporated in other types of devices.

Figure 24:
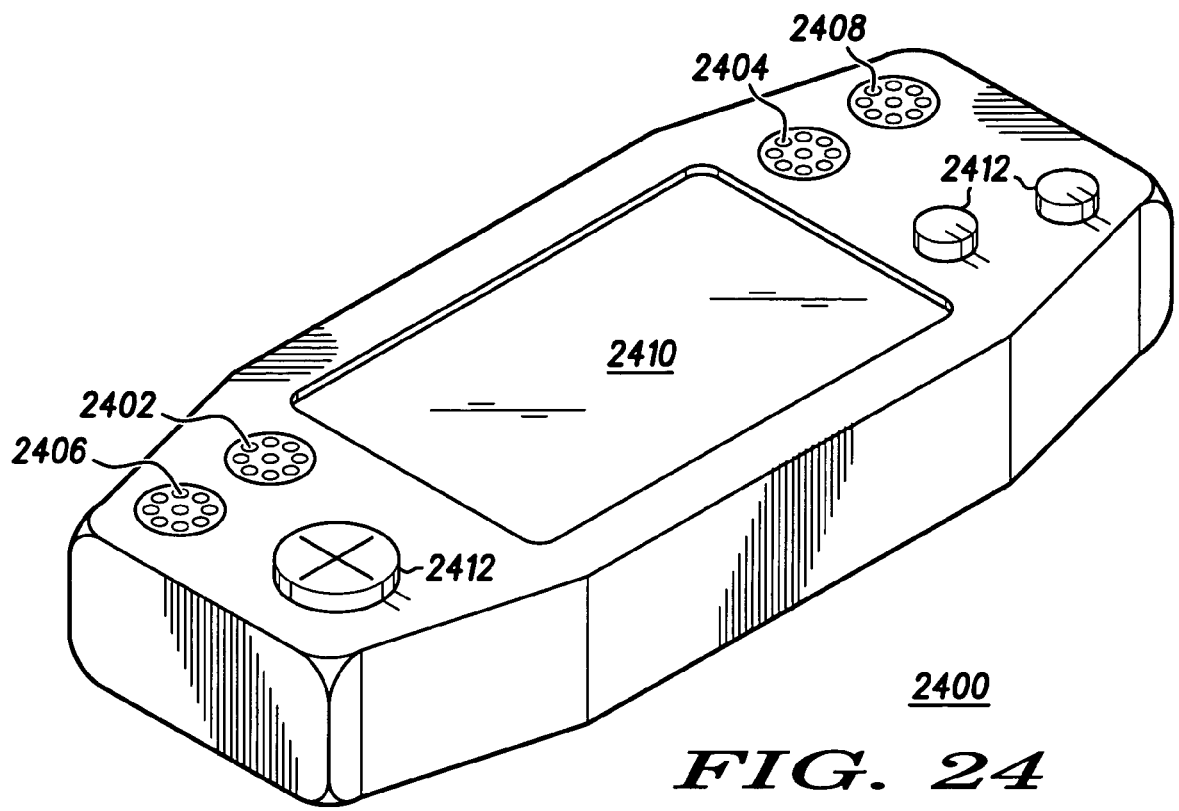
FIG. 24 is a handheld game console that includes an improved loudspeaker system.

FIG. 24 is a handheld game console 2400 that includes an improved loudspeaker system. The improved loudspeaker system of the game console 2400 includes a first dipole loudspeaker 2402, a second dipole loudspeaker 2404, a first monopole loudspeaker 2406 and a second monopole loudspeaker 2408. Other components of the loudspeaker system of the game console 2400 that are not shown in FIG. 24 are as shown in FIG. 22 and described above. The functioning of the loudspeaker system in the game console is as described above with reference to FIG. 22. The game console 2400 also includes a display 2410 and a plurality of control buttons 2412. The internal electronic design of the game console 2400 is analogous to that of the first cellular telephone shown in FIG. 13, with the exception that the game console 2400 need not include those elements used for cellular telephony. In the game console 2400 the included loudspeaker system is used to output stereo sound effects.

Figure 25:
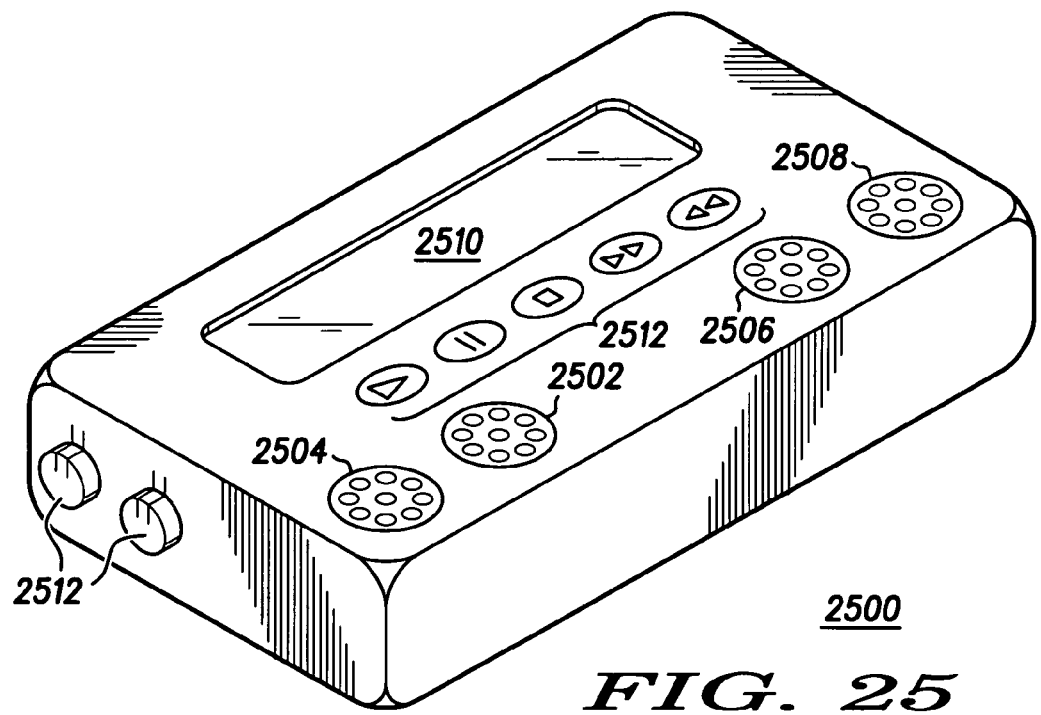
FIG. 25 is a handheld digital music player that includes an improved loudspeaker system.

FIG. 25 is a handheld digital music player 2500 that includes an improved loudspeaker system. The improved loudspeaker system of the handheld digital music player 2500 includes a first dipole loudspeaker 2502, a first monopole loudspeaker 2504, a second dipole loudspeaker 2506, and a second monopole loudspeaker 2508. Other components of the loudspeaker system of the music player 2500 that are not shown in FIG. 25 are as shown in FIG. 22 and described above. The functioning of the loudspeaker system in the music player 2500 is as described above with reference to FIG. 22. The music player also includes a display 2510 for displaying music titles, and a plurality of control buttons 2512 for controlling playback and volume. The internal electronic design of the music player 2500 is analogous to that of the first cellular telephone 100 shown in FIG. 13, with the exception that the music player 2500 need not include those elements used for cellular telephony. The music player 2500 suitably also includes a relative large removable or non-removable memory medium for storing digital files of encoded music.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A handheld device loudspeaker system comprising:
    a first loudspeaker that emits a first acoustic wave that is substantially omnidirectional, said first loudspeaker being described by a first electric-to-acoustic signal transfer function for acoustic signals radiated in a first direction;
    a second loudspeaker that emits a second acoustic wave in the first direction and emits, in a second direction that is opposite the first direction, a third acoustic wave that is opposite in phase relative to the second acoustic wave, said second loudspeaker being described by a second electric-to-acoustic signal transfer function for acoustic signals radiated in the first direction; and
    one or more drive circuits coupled to the first loudspeaker, and the second loudspeaker, said one or more drive circuits comprising:
    a first signal processing circuit for performing one or more filter functions, wherein the one or more filter functions compensate for a difference between the first electric-to-acoustic signal transfer function, and the second electric-to-acoustic signal transfer function.

2. The handheld device loudspeaker system according to claim 1 wherein:
    the first loudspeaker comprises a monopole loudspeaker; and
    the second loudspeaker comprises a dipole loudspeaker.

3. The handheld device loudspeaker system according to claim 2 wherein:
    the first loudspeaker comprises a diaphragm that has a diameter that is equal to one-quarter or less of a minimum wavelength that corresponds to a maximum frequency of audio signals used to drive the first loudspeaker and the second loudspeaker.

4. The handheld device loudspeaker system according to claim 1 wherein:
    the first loudspeaker comprises a first driven member having a first major surface and a second major surface opposite the first major surface, and wherein only said first major surface is coupled to air outside the handheld device loudspeaker system;
    the second loudspeaker comprises a second driven member having a third major surface and a fourth major surface opposite the third major surface, and wherein both the third major surface and the fourth major surface are coupled to air outside the handheld device loudspeaker system.

5. The handheld device loudspeaker system according to claim 4 comprising:
    a first resonator chamber including a first opening;
    a second resonator chamber disposed adjacent said first resonator chamber, said second resonator chamber including a second opening, wherein said first opening is coplanar with said second opening, and spaced from said second opening by a distance; and
    a speaker holder including a first bore, and a second bore spaced from said first bore by the distance, wherein said first loudspeaker is located in said first bore, and said second loudspeaker is located in said second bore, said speaker holder further including a rotatable coupling located concentrically about said first bore, wherein said rotatable coupling is rotatably engaged in said first opening;
    whereby, the second bore of said speaker holder with the second loudspeaker can be rotated away from said second resonator or into alignment with said second opening so as to convert said second loudspeaker into an omnidirectional loudspeaker.

6. The handheld device loudspeaker system according to claim 4 wherein:
    said fourth major surface is acoustically coupled to a closeable acoustic port that leads to air outside the handheld device loudspeaker system;
    whereby, upon closing said closeable port, said second loudspeaker is caused to emit a fourth acoustic wave that is substantially omni directional.

7. The handheld device loudspeaker system according to claim 6 wherein:
said first loudspeaker is backed by a first acoustic cavity; and
said second loudspeaker is backed by a second acoustic cavity that includes said closeable acoustic port.

8. The handheld device loudspeaker system according to claim 1 wherein the first signal processing circuit comprises:
a programmable processor; and
a program memory for storing a program for performing the one or more filter functions, said program memory being coupled to the programmable processor for transferring program instructions from the program to the programmable processor.

9. The handheld device loudspeaker system according to claim 1 wherein:
the one or more filter function includes one or more filter function for each particular direction of a plurality of directions, wherein said one or more filter function for each particular direction include a frequency dependent magnitude that compensates for a difference between magnitudes of transfer functions of the first and second loudspeakers, and each filter function further includes a frequency dependent phase that steers acoustic waves in the particular direction.

10. The handheld device loudspeaker system according to claim 1 further comprising:
a resonator including an opening, wherein said first loudspeaker is mounted in said opening;
a hinge attached to the resonator, proximate said opening; and
a lid including said second loudspeaker attached by said hinge to said resonator;
whereby, said second loudspeaker can be swung from a first position that is laterally separated from said first loudspeaker into a second position over said first loudspeaker.

11. The handheld device loudspeaker system according to claim 10 wherein:
said first loudspeaker comprises a first diaphragm;
said second loudspeaker comprises a second diaphragm;
said loudspeaker system further comprises a sensor for producing a sensor signal that is indicative of whether said second loudspeaker is in said first position or said second position; and
wherein, said one or more drive circuits are adopted to respond to said sensor signal by changing a phase of signals applied to either said first loudspeaker or said second loudspeaker, such that driving of said first loudspeaker diaphragm and said second loudspeaker diaphragm will be substantially synchronized when said second loudspeaker is in said second position over said first loudspeaker;
whereby, when said second loudspeaker is in said second position over said first loudspeaker, the handheld device loudspeaker system is reconfigured as a substantially isobarik loudspeaker.

12. The handheld device loudspeaker system according to claim 1 further comprising:
a third loudspeaker that emits a fourth acoustic wave that is substantially omnidirectional;
a fourth loudspeaker that emits a fifth acoustic wave in a third direction and emits, in a fourth direction that is opposite the third direction, a sixth acoustic wave that is opposite in phase relative to the fifth acoustic wave;
wherein said one or more drive circuits comprise a pair of stereo signal sources including a left side signal source, and a right side signal source, wherein said left side signal source is coupled to said first loudspeaker and said second loudspeaker; and said right side signal source is coupled to said third loudspeaker and fourth loudspeaker; and
wherein, said one or more drive circuits further comprise a second signal processing circuit for performing one or more filter functions on at least a signal applied to one of said third and fourth loudspeakers for compensating for a difference between electric-to-acoustic signal transfer functions of said third and fourth loudspeakers.

13. The handheld device loudspeaker system according to claim 1 further comprising:
a third loudspeaker that emits a fourth acoustic wave in a third direction and emits, in a fourth direction that is opposite the third direction a fifth acoustic wave that is opposite in phase relative to the fourth acoustic wave;
wherein said one or more drive circuits comprise a pair of stereo signal sources including a left side signal source, and a right side signal source, wherein said left side signal source is coupled to said first loudspeaker and said second loudspeaker, and said right signal source is coupled to said first loudspeaker and said third loudspeaker; and
wherein said one or more drive circuits comprise a second signal processing circuit for performing one or more filter functions on at least a signal applied to said third loudspeaker for compensating for a difference between electric-to-acoustic signal transfer functions of said first and third loudspeakers.

14. A wireless communication device comprising:
a transceiver for receiving wireless signals that include audio signals;
a processor coupled to the transceiver for processing said audio signals included in said wireless signals;
a first loudspeaker coupled to said processor, wherein said first loudspeaker emits a first acoustic wave that is substantially omnidirectional, said first loudspeaker being described by a first electric-to-acoustic signal transfer function for acoustic waves radiated in a first direction;
a second loudspeaker coupled to said processor, wherein said second loudspeaker emits a second acoustic wave in the first direction and emits, in a second direction that is opposite the first direction, a third acoustic wave that is opposite in phase relative to the second acoustic wave, said second loudspeaker being described by a second electric-to-acoustic signal transfer function for acoustic waves radiated in the first direction; and
a program memory coupled to the processor, said program memory including a first program that is executed by the processor, wherein said processor is programmed by said first program to:
apply one or more filter functions to said audio signals, wherein one or more filter functions compensate for a difference between the first electric-to-acoustic signal transfer function, and the second electric-to-acoustic signal transfer function; and drive said first and second loudspeakers with said audio signals.

15. The wireless communication device according to claim 14 further comprising:
a plurality of microphones coupled to said processor,
wherein said program memory also includes a second, direction of arrival algorithm that programs said processor to determine a direction from which a user's voice is received by said plurality of microphones; and
wherein said processor is further programmed by said first program to select a filter function based on the direction from which the user's voice is received in order to steer sound radiated by said first loudspeaker and said second loudspeaker in the direction from which the user's voice was received.

16. The wireless communication device according to claim 14 wherein said program memory also includes a second program for varying a degree of directionality of audio emitted by the first and second loudspeakers by adjusting relative amplitudes of a first audio signal applied to the first loudspeaker and a second audio signal applied to the second loudspeaker.

* * * * *